United States Patent
Yamashita

(10) Patent No.: US 8,824,899 B2
(45) Date of Patent: Sep. 2, 2014

(54) TERMINAL DEVICE, METHOD OF CONTROLLING THE SAME, COMPUTER-READABLE STORAGE MEDIUM STORING PROGRAM THERFOR

(75) Inventor: Kazuhisa Yamashita, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 419 days.

(21) Appl. No.: 12/935,179

(22) PCT Filed: Mar. 23, 2009

(86) PCT No.: PCT/JP2009/055638
§ 371 (c)(1),
(2), (4) Date: Sep. 28, 2010

(87) PCT Pub. No.: WO2009/119491
PCT Pub. Date: Oct. 1, 2009

(65) Prior Publication Data
US 2011/0026926 A1    Feb. 3, 2011

(30) Foreign Application Priority Data
Mar. 28, 2008  (JP) ................. 2008-087518

(51) Int. Cl.
G02F 1/00 (2006.01)
G02F 2/00 (2006.01)
H01S 3/00 (2006.01)
H04B 10/00 (2013.01)
H04J 14/00 (2006.01)
H04J 3/16 (2006.01)
H04Q 11/00 (2006.01)

(52) U.S. Cl.
CPC ....... *H04Q 11/0067* (2013.01); *H04Q 11/0071* (2013.01); *H04J 3/1694* (2013.01); *H04Q 2011/0064* (2013.01); *H04Q 2011/0041* (2013.01); *H04Q 2011/003* (2013.01); *H04Q 11/0005* (2013.01); *H04Q 2011/0081* (2013.01)
USPC ............ 398/168; 398/1; 398/2; 398/5; 398/7; 398/8; 398/140; 398/153

(58) Field of Classification Search
None
See application file for complete search history.

(56) References Cited

U.S. PATENT DOCUMENTS 5,801,858 A * 9/1998 Roberts et al. ............. 398/97
2002/0109876 A1 * 8/2002 Eijk et al. .................... 359/110

(Continued)

FOREIGN PATENT DOCUMENTS

JP    2000-332857    11/2000
JP    2002-049502 A    2/2002

(Continued)

OTHER PUBLICATIONS

"64. Multi-point MAC Control," "65. Extensions of the Reconciliation Sublayer (RS) and Physical Coding Subplayer (PCS)/Physical Media Attachment (PMA) for 1000BASE-X for Multi-Point Links and Forward Error Correction." IEEE Std 802.3ah-2004, pp. 421-506.

(Continued)

*Primary Examiner* — Darren E Wolf
(74) *Attorney, Agent, or Firm* — McDermott Will & Emery LLP

(57) ABSTRACT

OSUs 1 to N are connected to a plurality of PON lines respectively. A control unit performs processing for registering a plurality of subscriber devices connected to the plurality of PON lines respectively and processing for allocating a bandwidth. In addition, the control unit switches an OSU while a state of registration of the plurality of subscriber devices is maintained, by changing a communication path between the plurality of PON lines and a plurality of OSUs 1 to N.

9 Claims, 27 Drawing Sheets

(56) References Cited

U.S. PATENT DOCUMENTS

| | | |
|---|---|---|
| 2003/0170032 A1* | 9/2003 | Song et al. ............... 398/168 |
| 2006/0013260 A1* | 1/2006 | Oron ........................ 370/498 |
| 2007/0058973 A1 | 3/2007 | Tanaka |
| 2007/0268818 A1 | 11/2007 | Sugihara |
| 2011/0026926 A1 | 2/2011 | Yamashita |

FOREIGN PATENT DOCUMENTS

| | | |
|---|---|---|
| JP | 2004-201013 | 7/2004 |
| JP | 2004-253881 | 9/2004 |
| JP | 2006-262018 | 9/2006 |
| JP | 2007-036926 | 2/2007 |
| JP | 2007-067601 | 3/2007 |
| JP | 2007-311953 A | 11/2007 |
| JP | 4941379 B2 | 5/2012 |

OTHER PUBLICATIONS

Office Action issued in Japanese Patent Application No. 2012-031682 dated Jun. 4, 2013.

* cited by examiner

TERMINAL DEVICE, METHOD OF CONTROLLING THE SAME, COMPUTER-READABLE STORAGE MEDIUM STORING PROGRAM THERFOR

RELATED APPLICATIONS

This application is the U.S. National Phase under 35 U.S.C. §371 of International Application No. PCT/JP2009/055638, filed on Mar. 23, 2009, which in turn claims the benefit of Japanese Application No. 2008-087518, filed on Mar. 28, 2008, the disclosures of which Applications are incorporated by reference herein.

TECHNICAL FIELD

The present invention relates to a PON (Passive Optical Network) representing medium-sharing communication in which a plurality of subscriber devices share a medium for data transmission. In particular, the present invention relates to a terminal device achieving an enhanced fault-resilient function based on redundancy of a plurality of optical subscriber units (hereinafter referred to as OSU) terminating on a station side, a method of controlling the same, and a computer-readable storage medium storing a program therefor.

BACKGROUND ART

The Internet has widely been used in recent years and users can access various types of information on sites operated all over the world and can obtain such information. Use of devices adapted to broadband access such as ADSL (Asymmetric Digital Subscriber Line) and FTTH (Fiber To The Home) has also rapidly spread accordingly.

Prior techniques relating thereto include techniques disclosed in Japanese Patent Laying-Open No. 2007-036926 (Patent Document 1), Japanese Patent Laying-Open No. 2007-067601 (Patent Document 2), and "IEEE Std 802.3ah-2004" (Non-Patent Document 1). According to the invention disclosed in Japanese Patent Laying-Open No. 2007-036926, a hot optical terminal unit communicates with a plurality of user optical terminal devices through optical transmission paths. The unit has an administrative information storage device for storing administrative information for the plurality of user optical terminal devices. A stand-by optical terminal unit has a storage device capable of storing administrative information transferred from the hot optical terminal unit. A control device controls switching from the hot optical terminal unit to the stand-by optical terminal unit.

In addition, in the invention disclosed in Japanese Patent Laying-Open No. 2007-067601, an L3 switch having a port mirroring function is arranged upstream of an OLT (Optical Line Terminal) and a 2:1 optical coupler is arranged downstream thereof. Prior to start switching, administrative information and setting information are transferred from a first OLT to a second OLT. When a special frame indicating start of switching is input from a switch to the first and second OLTs, the first OLT stops taking in of downstream data and the second OLT starts taking in the downstream data. Allocation of bandwidth to an ONU (Optical Network Unit) is temporarily suspended, the second OLT is instructed to take in upstream data, and allocation of bandwidth to the ONU is then resumed. When there is no down data for the first OLT, administrative information is transferred from the first OLT to the second OLT. The second OLT operates normally.

Further, "IEEE Std 802.3ah-2004" (Non-Patent Document 1) defines one scheme for PON, that is, EPON (Ethernet® PON), under which all information including user information passing through a PON and control information for administering and operating a PON are communicated in a form of an Ethernet® frame, an access control protocol (MPCP (Multi-Point Control Protocol)) or an OAM (Operations, Administration and Maintenance) protocol therefor. By exchanging MPCP frames between a terminal device and a subscriber device, joining, leaving, upstream multiple access control, or the like of a subscriber device is carried out.

It is noted that, in 10GEPON (EPON in which a communication rate is adapted to 10 Gbps) standardized as IEEE802.3av as well, an access control protocol is premised on the MPCP.

Furthermore, Japanese Patent Laying-Open No. 2004-201013 (Patent Document 3) shows that a layer 2 switch (L2SW) is generally used for further integrating upper links of a plurality of PONs. In L2SW, relay processing for each terminal MAC address is performed.

Patent Document 1: Japanese Patent Laying-Open No. 2007-036926
Patent Document 2: Japanese Patent Laying-Open No. 2007-067601
Patent Document 3: Japanese Patent Laying-Open No. 2004-201013
Non-Patent Document 1: IEEE Std 802.3ah-2004

DISCLOSURE OF THE INVENTION

Problems to be Solved by the Invention

According to the inventions described in Japanese Patent Laying-Open No. 2007-036926 (Patent Document 1) and Japanese Patent Laying-Open No. 2007-067601 (Patent Document 2), administrative information necessary for an operation of an OSU is transferred when the OSU is switched. Therefore, disadvantageously, a time period for switching becomes longer and a normal operation cannot be achieved after switching if the transferred administrative information itself is incorrect.

In addition, even if a fault has not yet come to the surface, a module may be replaced for precautionary purposes, in consideration of tendency of deterioration in characteristics, life of parts, and the like. If a system has a redundant configuration for a module, a system down time for such maintenance work can be minimized.

Moreover, a CPU is arranged for each OSU, and abnormality of an OSU including a CPU cannot be addressed. Therefore, vulnerability to abnormality of an OSU has been a problem.

Further, in a configuration where an administrative information storage unit is shared and switching of an OSU is made without transferring administrative information, an abnormal OSU may destroy administrative information of other OSUs.

Furthermore, in a configuration where concentration of upper links of OSUs is carried out by an L2SW, if an OSU is switched, a terminal MAC address belonging to the OSU is stored in association with a port of the OSU before switching. Therefore, downstream frames are not delivered to a new OSU until age out of memory or re-learning as a result of arrival of a new upstream frame, and consequently, a time period for switching has been long. Even though relation between a terminal MAC address and an OSU port is forcibly set again, the number of terminal MAC addresses is large and hence a time period for switching has still been long.

The present invention was made to solve the above-described problems, and a first object is to provide a terminal device capable of quickly achieving redundancy-adapted switching.

A second object is to provide a terminal device capable of achieving improved fault-resilient performance without significantly lowering cost effectiveness.

Means for Solving the Problems

According to one aspect of the present invention, a terminal device accommodating a plurality of passive optical networks is provided. The present terminal device includes a plurality of optical subscriber units connected to the plurality of passive optical networks respectively, and a control unit for performing processing for registering a plurality of subscriber devices connected to the plurality of passive optical networks and processing for bandwidth allocation. The control unit switches the optical subscriber unit while a state of registration of the plurality of subscriber devices is maintained, by changing a communication path between the plurality of passive optical networks and the plurality of optical subscriber units.

As the control unit changes a communication path between the plurality of passive optical networks and the plurality of optical subscriber units, switching of the optical subscriber unit is made while a state of registration of the plurality of subscriber devices is maintained. Therefore, redundancy-adapted switching can quickly be made.

Preferably, the terminal device further includes a concentration portion for multiplexing upstream frames from the plurality of optical subscriber units and transmitting the multiplexed upstream frames to an upper link and distributing downstream frames from the upper link to each optical subscriber unit. The control unit switches the optical subscriber unit while a state of registration of the plurality of subscriber devices is maintained, by changing a communication path between the plurality of passive optical networks and the plurality of optical subscriber units and by changing setting of the concentration portion.

As the control unit changes a communication path between the plurality of passive optical networks and the plurality of optical subscriber units and changes setting of the concentration portion, switching of the optical subscriber unit is made while a state of registration of the plurality of subscriber devices is maintained. Therefore, in a configuration where upper links of the plurality of optical subscriber units are concentrated as well, redundancy-adapted switching of the optical subscriber unit can quickly be made.

Preferably, the terminal device further includes an optical switch portion for switching connection between the plurality of optical subscriber units and the plurality of passive optical networks. The plurality of optical subscriber units include a stand-by optical subscriber unit, and the control unit controls the optical switch portion to make such switching that at least one of the plurality of passive optical networks is connected to the stand-by optical subscriber unit while a state of registration of the plurality of subscriber devices is maintained.

Therefore, fault-resilient performance can be improved without significantly lowering cost effectiveness.

Preferably, the plurality of optical subscriber units include an active optical subscriber unit and a stand-by optical subscriber unit. The control unit switches a communication path with the plurality of passive optical networks, from a communication path via the active optical subscriber unit to a communication path via the stand-by optical subscriber unit while a state of registration of the plurality of subscriber devices is maintained.

Therefore, even when a fault occurs in a plurality of optical subscriber units, communication can be maintained and hence fault-resilient performance can further be improved.

Preferably, the terminal device includes an active control unit and a stand-by control unit. The active control unit switches from the active control unit to the stand-by control unit while a state of registration of the plurality of subscriber devices is maintained.

Therefore, fault-resilient performance of the control unit can be improved without significantly lowering cost effectiveness.

Preferably, the terminal device includes an active control unit and a stand-by control unit and an active concentration portion and a stand-by concentration portion, and the active control unit switches from the active control unit to the stand-by control unit or switches from the active concentration portion to the stand-by concentration portion while a state of registration of the plurality of subscriber devices is maintained.

Therefore, in addition to improvement in fault-resilient performance of the control unit, fault-resilient performance of the concentration portion can be improved without significantly lowering cost effectiveness.

According to another aspect of the present invention, a method of controlling a terminal device accommodating a plurality of passive optical networks is provided. The present control method includes the steps of successively performing processing for registering a plurality of subscriber devices connected to the plurality of passive optical networks and processing for bandwidth allocation, and changing a communication path for control messages for performing the processing for registration and bandwidth allocation while a state of registration of the plurality of subscriber devices is maintained.

According to yet another aspect of the present invention, a computer-readable storage medium storing a program for causing a computer to perform a method of controlling a terminal device accommodating a plurality of passive optical networks is provided. The program causes the computer to perform the steps of successively performing processing for registering a plurality of subscriber devices connected to the plurality of passive optical networks and processing for bandwidth allocation, determining a communication path for control messages for performing the processing for registration and bandwidth allocation by OSU mapping, and changing OSU mapping while a state of registration of the plurality of subscriber devices is maintained.

Effects of the Invention

According to one aspect of the present invention, as the control unit changes a communication path between the plurality of passive optical networks and the plurality of optical subscriber units, switching of the optical subscriber unit is made while a state of registration of the plurality of subscriber devices is maintained. Therefore, redundancy-adapted switching can quickly be made.

DESCRIPTION OF THE REFERENCE SIGNS 1a, 1b, 1c, 1d terminal device; 2 ONU; 3 PON line; 4 optical coupler; 11a, 11b optical switch; 12 OSU; 13a, 13b concentration portion; 14 control unit; 21 actuator; 22 movable mirror; 23, 24 collimating lens; 25 system selection unit; 31 concentration IF portion; 32 control IF portion; 33 reception processing unit; 34 transmission processing unit; 35 PON transmission and reception unit; 36 local control unit; 37, 38, 47 FIFO; 41 upper link transmission and reception unit; 42 downstream distribution unit; 43 concentration control unit; 44 control IF portion; 45 OSU IF portion; 46 filter portion; 48 selector; 51 CPU; 52 ROM; 53 RAM; 54 IO control unit; 55 OSU IF portion; 56 shared RAM; and 57 clock & timer.

BEST MODES FOR CARRYING OUT THE INVENTION

Details of an embodiment of the present invention will be described hereinafter, however, it is to be understood, as common premises in embodiments, that a PON is a PON based on Ethernet® (an EPON), and registration and deregistration of an ONU, bandwidth allocation to an ONU, a request of a bandwidth from an ONU, or the like is carried out using an MPCP frame defined under IEEE802.3ah.

First Embodiment

Figure 1:
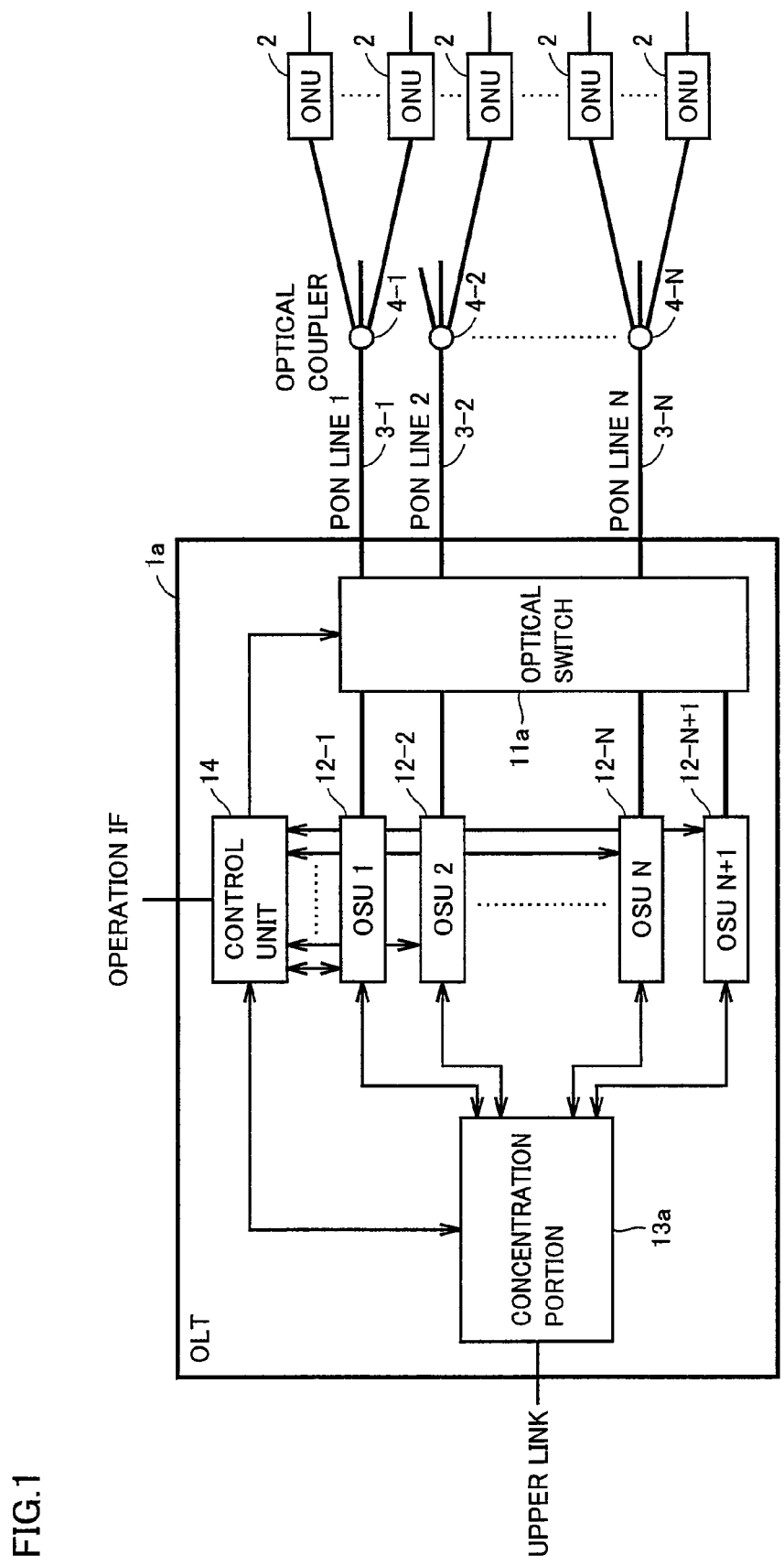
FIG. 1 is a block diagram showing a schematic configuration of a terminal device in a first embodiment of the present invention.

FIG. 1 is a block diagram showing a schematic configuration of a terminal device in a first embodiment of the present invention. This terminal device (hereinafter referred to as an OLT) 1a is connected to N PON lines 1 to N (3-1 to 3-N) and can terminate N PON lines. PON lines 1 to N (3-1 to 3-N) are connected to optical couplers 4-1 to 4-N respectively and connected to a plurality of ONUs 2 through the optical couplers respectively.

Terminal device 1a includes an optical switch 11a, N+1 OSUs 1 to N+1 (12-1 to 12-N+1), a concentration portion 13a, and a control unit 14 for overall control of terminal device 1a. This terminal device 1a has a redundant configuration including one stand-by OSU N+1 for N OSUs 1 to N (this redundant configuration will be hereinafter referred to as "N:1 redundant configuration").

Optical switch 11a switches connection between N+1 OSUs 1 to N+1 (12-1 to 12-N+1) and N PON lines 1 to N (3-1 to 3-N), in response to an instruction from control unit 14.

Concentration portion 13a performs processing for multiplexing upstream frames from OSUs 1 to N+1 (12-1 to 12-N+1) and transmitting the multiplexed upstream frame to a higher network (hereinafter referred to as an "upper link") as well as distributing a downstream frame received from the upper link to an appropriate OSU.

Figure 2:
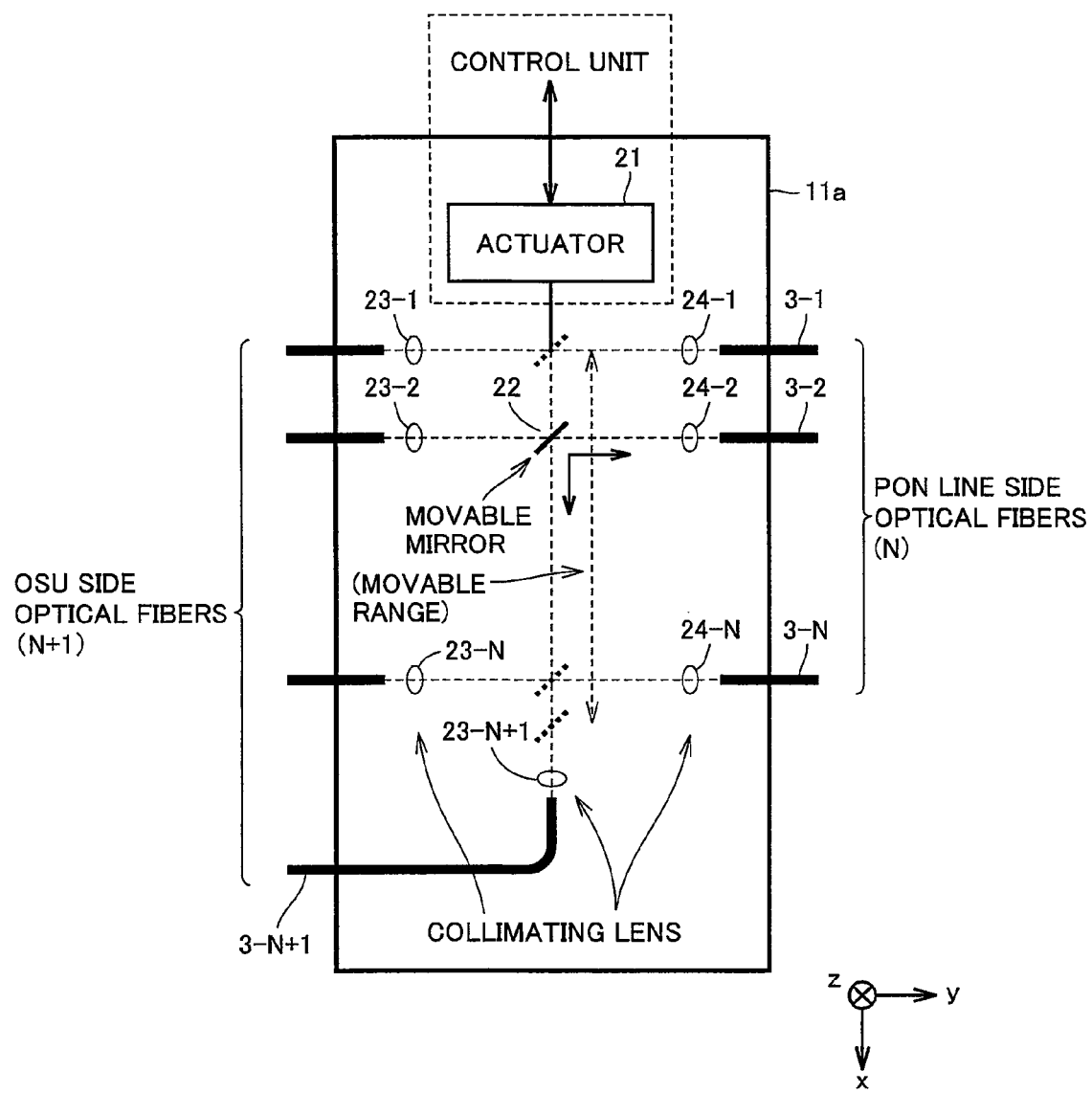
FIG. 2 is a diagram showing an exemplary configuration of an optical switch.

FIG. 2 is a diagram showing an exemplary configuration of optical switch 11a. In this optical switch 11a, N optical fibers on a PON side and N optical fibers on an OSU side are arranged in an opposed manner. Hereinafter, these N optical fibers 3-1 to 3-N will be referred to as "regular optical fibers."

Collimating lenses 23-1 to 23-N are arranged around respective end surfaces of optical fibers on the OSU side and collimating lenses 24-1 to 24-N are arranged around respective end surfaces of optical fibers on the PON line side, so that optical space transmission between the opposed optical fibers is performed in a normal state. Optical axes of these N optical fibers are arranged in parallel to one another on an identical plane.

A movable mirror 22 is driven by an actuator 21, so that it can move on an axis orthogonal to optical axes of N optical fibers 3-1 to 3-N. Movable mirror 22 is inclined at an angle of 45° with respect to optical axes of the regular optical fibers, to thereby reflect light beams from an optical fiber on the PON line side in a direction of axis of movement of movable mirror 22. The light beams reflected by movable mirror 22 are incident on a stand-by optical fiber 3-N+1 through collimating lens 23-N+1.

In addition, light beams from stand-by optical fiber 3-N+1 are reflected by movable mirror 22 and incident on an optical fiber on the PON line side where movable mirror 22 is located. Therefore, optical space transmission between the optical fiber on the PON line side where movable mirror 22 is located and the stand-by optical fiber can be carried out.

Here, in moving movable mirror 22, movable mirror 22 is once displaced in the z direction (a direction from front to rear of the sheet surface of FIG. 2) and then moving movable mirror 22 in the x direction or the like, so that optical space transmission in a pair of optical fibers irrelevant to switching among pairs of opposing optical fibers is not affected.

Movable mirror 22 can be positioned at any of N+1 positions including intersections of optical axes of N regular optical fibers and a stand-by position. Actuator 21 moves movable mirror 22 to an appropriate position within a range of N+1 positions above, in response to a control signal from control unit 14. The control signal from control unit 14 indicates whether to make redundancy-adapted switching of an OSU and a number of a PON line to be switched, and in response thereto, actuator 21 moves movable mirror 22.

Figure 3:
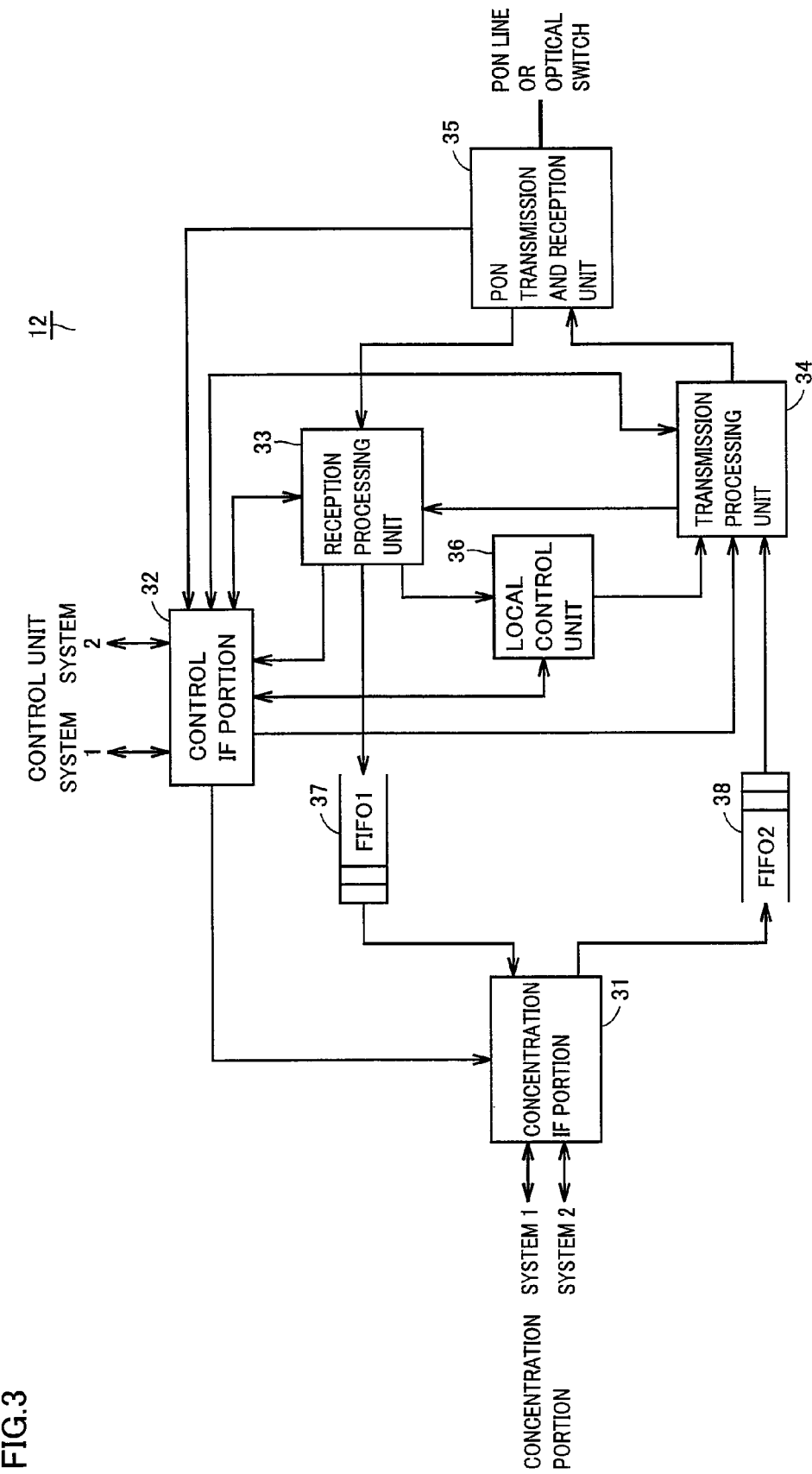
FIG. 3 is a block diagram showing an exemplary configuration of an OSU.

FIG. 3 is a block diagram showing an exemplary configuration of an OSU. An OSU 12 includes a concentration IF (Interface) portion 31, a control IF portion 32, a reception processing unit 33, a transmission processing unit 34, a PON transmission and reception unit 35, a local control unit 36, an FIFO 1 (37) storing upstream frames, and an FIFO 2 (38) storing downstream frames.

Figure 4:
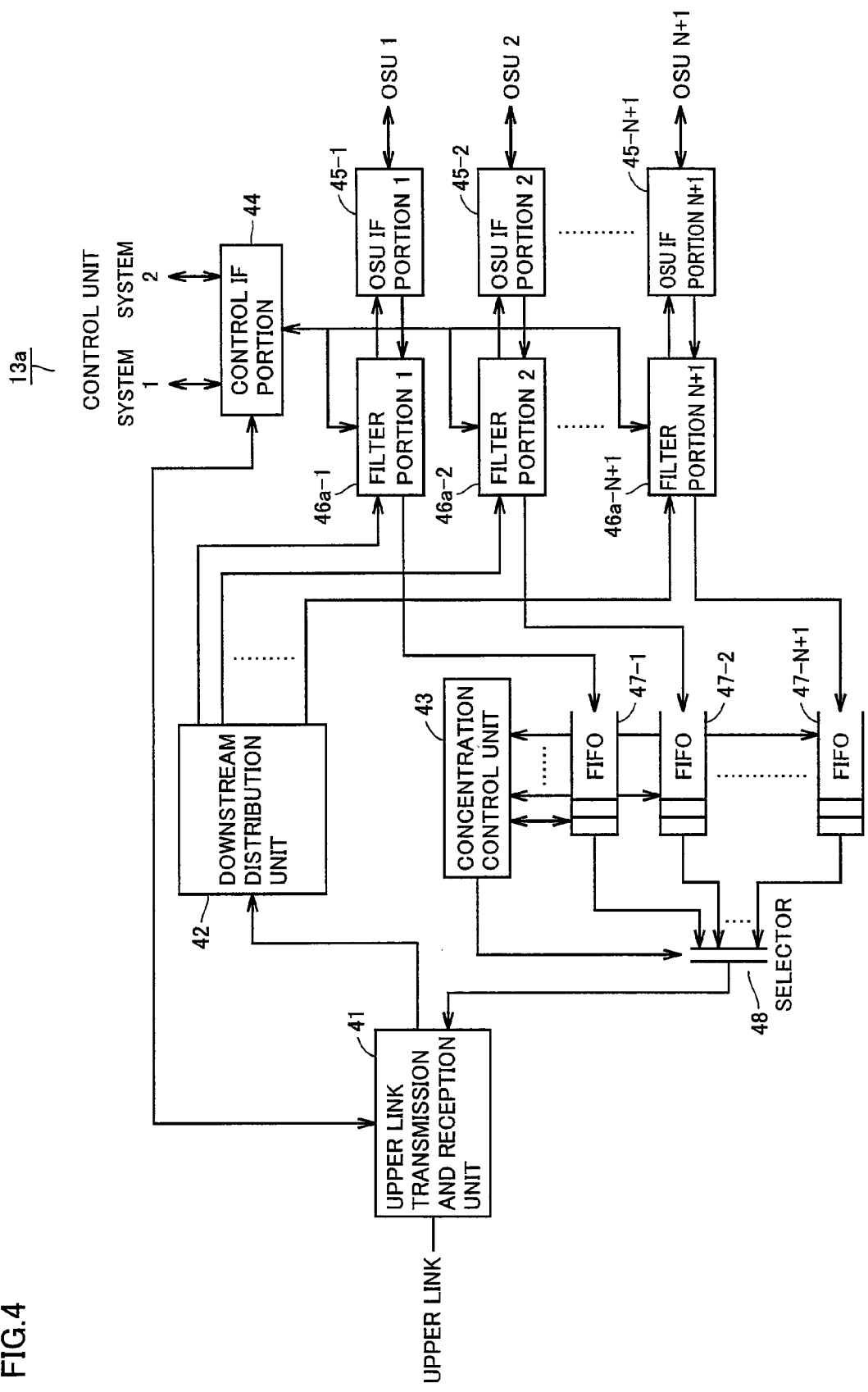
FIG. 4 is a block diagram showing an exemplary configuration of a concentration portion.
Figure 5:
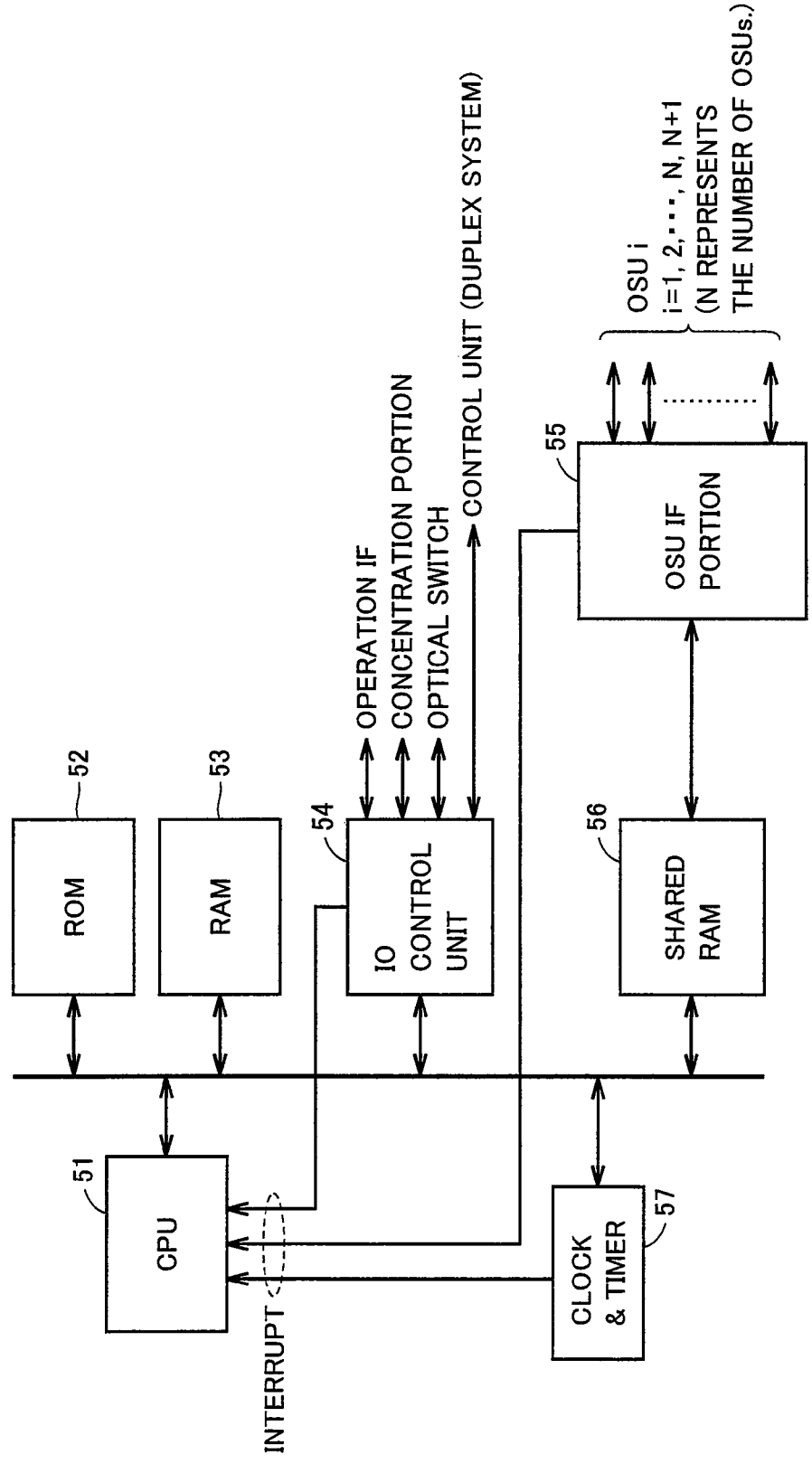
FIG. 5 is a block diagram showing an exemplary configuration of a control unit.

In FIGS. 3 to 5, configurations of an OSU, a concentration portion and a control unit are described in a form including duplexing which will be described in third and fourth embodiments later. In FIG. 3, concentration IF portion 31 and control IF portion 32 are not adapted to a duplex system, but they are connected to a single concentration portion 13*a* and a single control unit 14 respectively. In addition, PON transmission and reception unit 35 is connected to optical switch 11*a*. This is also applicable to FIGS. 4 and 5.

PON transmission and reception unit 35 is connected to optical switch 11*a* through a single optical fiber. PON transmission and reception unit 35 receives an upstream optical signal having a specific wavelength, for example, in a 1310 nm band so that bidirectional communication can be established on this optical fiber, converts this optical signal into an electrical signal, and outputs the signal to reception processing unit 33, while it multiplexes electrical signals output from transmission processing unit 34 as a downstream optical signal having a different wavelength, for example, in a 1490 nm band.

Reception processing unit 33 re-constructs a frame from an electrical signal received from PON transmission and reception unit 35, and distributes the frame to control IF portion 32, local control unit 36 or FIFO 1 (37) depending on a type of the frame. Specifically, reception processing unit 33 outputs a user frame to FIFO 1 (37), outputs a special control frame such as a loopback check to local control unit 36, and outputs other general control frames to control IF portion 32.

In addition, reception processing unit 33 may receive grant information indicating when frames from which logical link is to be received from transmission processing unit 34 and may filter out not-granted reception frames. Moreover, reception processing unit 33 may overwrite an MPCP frame with a time stamp at the time of reception and then output the frame.

Concentration IF portion 31 sends upstream frames stored in FIFO 1 (37) to concentration portion 13*a* and causes FIFO 2 (38) to store downstream frames received from concentration portion 13*a*. Here, concentration IF portion 31 carries out conversion between a signal format of concentration portion 13*a* and an internal signal format.

When FIFO 2 (38), control IF portion 32 or local control unit 36 has a frame/message to be transmitted, transmission processing unit 34 receives the frame/message in accordance with priority, builds up the frame, and outputs the frame to PON transmission and reception unit 35. Here, transmission processing unit 34 may overwrite an MPCP frame with a time stamp at the time of transmission and then output the frame. In addition, transmission processing unit 34 outputs grant information described in a gate message from control IF portion 32 to reception processing unit 33.

Control IF portion 32 outputs a control message received from reception processing unit 33 to control unit 14 and outputs a control message received from control unit 14 to transmission processing unit 34. Here, control IF portion 32 carries out conversion between a signal format of control unit 14 and an internal signal format.

In principle, a control protocol for administering and operating a PON is terminated by control unit 14. It is noted, however, that a specific protocol is terminated by local control unit 36 in order to alleviate processing load imposed on control unit 14. In the present embodiment, local control unit 36 performs loopback check for an ONU representing one type of an OAM, in response to an instruction from control unit 14. Namely, local control unit 36 sets a loopback check mode, generates a loopback check frame, inspects a frame returned as a result of loopback, gives notification of a result, and resets the loopback mode.

PON transmission and reception unit 35 collects statistic information such as the number of transmission frames, the number of reception frames, or the number of code errors in a reception signal, and notifies control unit 14 of the information through control IF portion 32. The statistic information is used in determining switching between systems when a control unit or the like is adapted to a duplex system as will be described later. For example, when the number of code errors in a reception signal is greater, control for switching to another system or the like is carried out.

In addition, PON transmission and reception unit 35 monitors its own transmission light level. If a transmission light level is out of a defined range due to failure or aging deterioration of a light emitting device, PON transmission and reception unit 35 issues an alarm to control unit 14 through control IF portion 32.

Reception processing unit 33 collects statistic information such as the number of reception frames for each frame type and notifies control unit 14 of the information through control IF portion 32. Similarly, transmission processing unit 34 collects statistic information such as the number of transmission frames for each frame type and notifies control unit 14 of the information through control IF portion 32.

FIG. 4 is a block diagram showing an exemplary configuration of concentration portion 13a. This concentration portion 13a includes an upper link transmission and reception unit 41, a downstream distribution unit 42, a concentration control unit 43, a control IF portion 44, OSU IF portions 1 to N+1 (45-1 to 45-N+1), filter portions 1 to N+1 (46a-1 to 46a-N+1), FIFOs 47-1 to 47-N+1, and a selector 48.

An OSU IF portion i (i=1 to N+1) converts an upstream frame sent from a corresponding OSU i into an internal signal format and temporarily causes a FIFO i to buffer the frame through a filter portion i.

Concentration control unit 43 administers states of FIFOs 47-1 to 47-N+1, determines an order of output to an upper link from not-empty FIFOs, and indicates transfer of an upstream frame from the not-empty FIFO to upper link transmission and reception unit 41. Here, concentration control unit 43 controls selector 48 so as to make such setting that the upstream frame output from the FIFO reaches upper link transmission and reception unit 41 through selector 48.

Upper link transmission and reception unit 41 transmits the upstream frame output from selector 48 to the upper link and outputs a downstream frame received from the upper link to downstream distribution unit 42.

Downstream distribution unit 42 copies the downstream frame received from upper link transmission and reception unit 41 and outputs the frames to respective filter portions 1 to N+1 (46a-1 to 46a-N+1).

Filter portion i (i=1 to N+1) refers to VLAN (Virtual LAN) header information stored in the downstream frame and determines to which PON line i the frame should be transmitted. Then, filter portion i filters out a downstream frame which should not be transmitted, performs necessary processing such as conversion or the like of a header for a downstream frame to be transmitted, and outputs the frame to OSU IF portion i. In addition, filter portion i connects or disconnects an upstream path and a downstream path, based on information on a redundant configuration possessed by control unit 14.

Filter portion N+1 (46a-N+1) corresponding to OSU N+1 may hold setting of all other filter portions, select setting corresponding to a switched line, and apply the setting. Here, setting of the filter portion refers to information used for filtering out a downstream frame such as VLAN information, a special reserved MAC address for each frame, information used for connection/disconnection of all paths in accordance with the redundant configuration, or the like.

Control IF portion 44 communicates with control unit 14 and gives notification of setting or a state of each portion/unit in concentration portion 13a, transfers an alarm, and the like.

In addition, upper link transmission and reception unit 41 collects statistic information such as the number of transmission frames, the number of reception frames, the number of code errors in a reception signal, and the like, and outputs such statistic information to control unit 14 through control IF portion 44 in response to an inquiry from control unit 14. Moreover, upper link transmission and reception unit 41 detects link establishment/disconnection at a physical layer level with/from an opposing device in the upper link and detects faulty transmission by monitoring its own output signal. Upper link transmission and reception unit 41 notifies control unit 14 of a corresponding alarm through control IF portion 44 when it detects disconnection of the upper link or faulty transmission.

FIG. 5 is a block diagram showing an exemplary configuration of control unit 14. Control unit 14 includes a CPU (Central Processing Unit) 51, a ROM (Read Only Memory) 52, a RAM (Random Access Memory) 53, an IO (Input Output) control unit 54, an OSU IF portion 55, a shared RAM 56, and a clock & timer 57. Namely, control unit 14 is typically implemented by a computer.

OSU IF portion 55 is connected to OSUs 1 to N+1 (12-1 to 12-N+1) and transmits and receives control frames transmitted and received to/from an ONU for controlling a PON or OSU information for administering and controlling an OSU, by using message communication. These messages are interfaced with CPU 51 through an ingress message queue and an egress message queue implemented by shared RAM 56.

IO control unit 54 receives a command from CPU 51, makes setting of concentration portion 13a and optical switch 11a, administers a state, and provides an operator with an operation interface (hereinafter operation IF) of terminal device 1a. In addition, receiving a response from the operation IF, concentration portion 13a and optical switch 11a or an event such as an alarm, IO control unit 54 gives notification to CPU 51 as an interrupt.

Clock & timer 57 administers a clock or various timers for administering the PONS, and outputs a time or an interrupt such as end of a timer to CPU 51.

ROM 52 stores a program for controlling overall control unit 14, fixed data or the like. RAM 53 is used as a work area or the like for temporarily storing data.

CPU 51 performs processing as will be described later by reading a program from ROM 52 and executing the program, reading the fixed data stored in ROM 52, and reading/writing data from/into RAM 53. Though FIG. 5 shows ROM 52 as a typical example of a computer-readable storage medium, a program (including an instruction code, setting data, and the like) may otherwise be stored in a magnetic storage medium such as a CD-ROM or an FD (Flexible Disk) or in a semiconductor storage medium such as a flash memory. In this case, a device connected to CPU 51 for reading a stored program from these storage media should be provided.

It is noted that a reference clock for driving a PON clock is provided also in each OSU and PON clocks of the OSUs are synchronized with one another by periodical notification of time through administrative communication.

Though processing by control unit 14 is basically similar to processing by a known OSU-local control unit, in order to control all PONs with a single CPU and a program and to achieve quick redundancy-adapted switching/recovery of an OSU, a concept of a virtual OSU and OSU mapping is introduced. It is noted that recovery refers to switching back to an original condition after redundancy-adapted switching.

An OSU usually interfaced as a result of execution of a program by CPU 51 is a virtual OSU. Namely, a virtual OSU is interfaced with an actual OSU by carrying out OSU mapping. For example, in switching a terminal of PON line i from OSU i to OSU N+1, OSU mapping is changed from (virtual OSU i⇔ actual OSU i) to (virtual OSU i⇔ actual OSU N+1). Thus, regardless of a state of redundancy-adapted switching/recovery of an OSU, virtual OSU i can correspond to PON line i.

Mounting of such OSU mapping may be realized by software processing by CPU 51 or by hardware processing by OSU IF portion 55. It is noted, however, that message communication of OSU control information for administering and controlling an OSU may be carried out by causing CPU 51 to execute a program and to directly designate an actual OSU.

Figure 6:
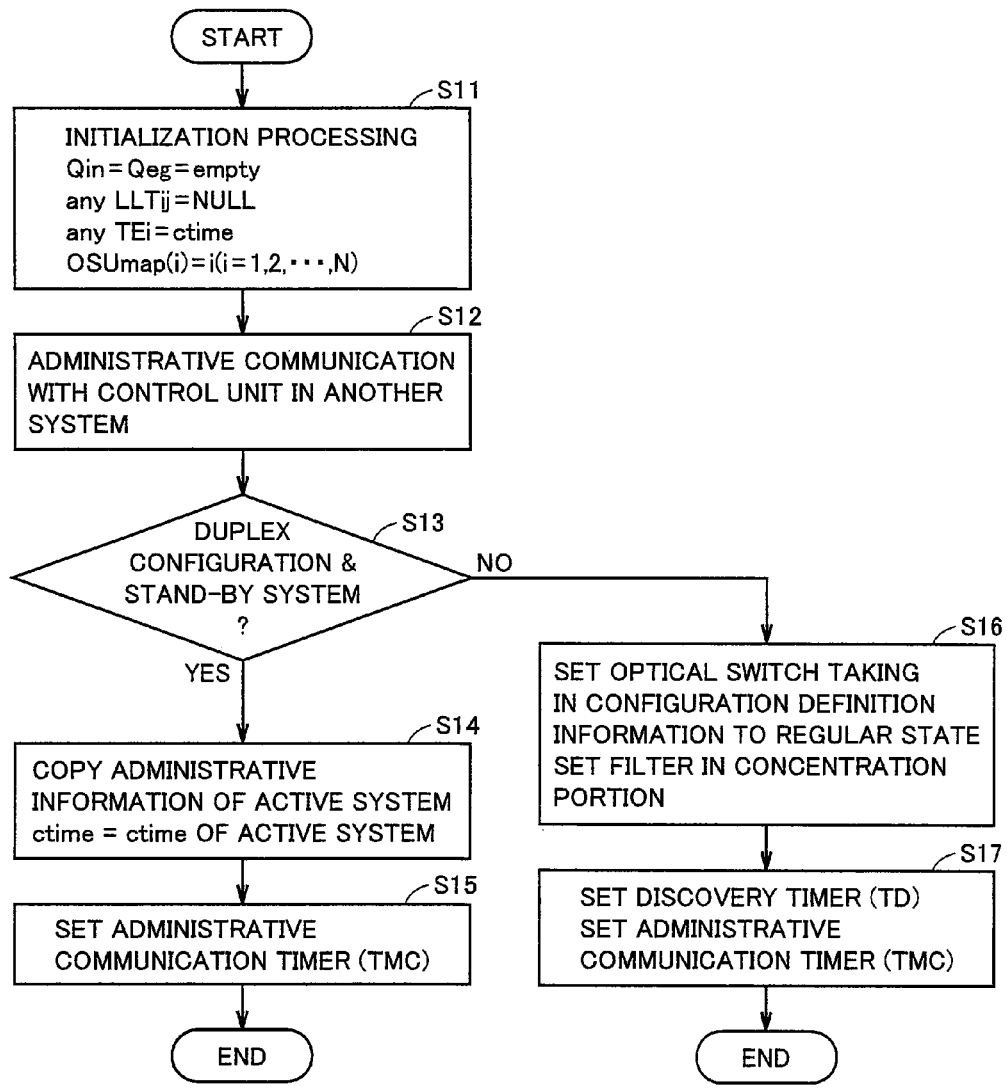
FIG. 6 is a flowchart for illustrating a procedure in initialization processing by the control unit.

FIG. 6 is a flowchart for illustrating a procedure in initialization processing by control unit 14. This initialization processing is performed for making necessary initial setting of each portion/unit in terminal device 1a. Here, a logical link table LLT and a latest allocation time TE are provided for each virtual OSU. Information specific to a logical link is stored in each element in logical link table LLT. Specifically, a logical link state LLstat, report information RPinfo, most recent report reception time RPtime, a round trip propagation time RTT, and a most recent OAM link connectivity check frame reception time OAMt are included.

Initially, CPU 51 empties an ingress message queue Qin and an egress message queue Qeg, sets any logical link table LLTij (i=1, 2, ..., N: jE∈{LLID of OSU i}) to NULL, sets any latest allocation time TEi to a current time ctime, and defines OSU mapping as OSUmap(i)=i (i=1, 2, ..., N) (S11).

Then, CPU 51 determines whether the control unit is duplexed or not and whether the control unit is a stand-by control unit or not (S13) by establishing administrative communication with a control unit in another system (S12). Though the control unit is not duplexed in the present embodiment, FIGS. 6 to 27 include such a procedure in order to describe also duplexed control units which will be described in the third and fourth embodiments. Therefore, in the present embodiment, active-system processing is performed without exception.

When the control unit is duplexed and the control unit is the stand-by control unit (S13, Yes), CPU 51 copies the administrative information of the active control unit and sets the clock to that of the active-system by setting current time ctime to a value of ctime in the active-system (S14). Then, CPU 51 sets an administrative communication timer (TMC) (S15) and the process ends.

When the control unit is not duplexed or when the control unit is the active control unit (S13, No), CPU 51 takes in configuration definition information through the operation IF and sets optical switch 11a to a regular state. Then, CPU 51 sets each filter portion within concentration portion 13a based on a transfer rule included in the configuration definition information, such as information indicating correspondence between a VLAN ID in a higher network through the upper link and a PON line (S16).

Finally, CPU 51 sets a discovery timer (TD) and sets the administrative communication timer (TMC) (S17), and the process ends.

Figure 7:
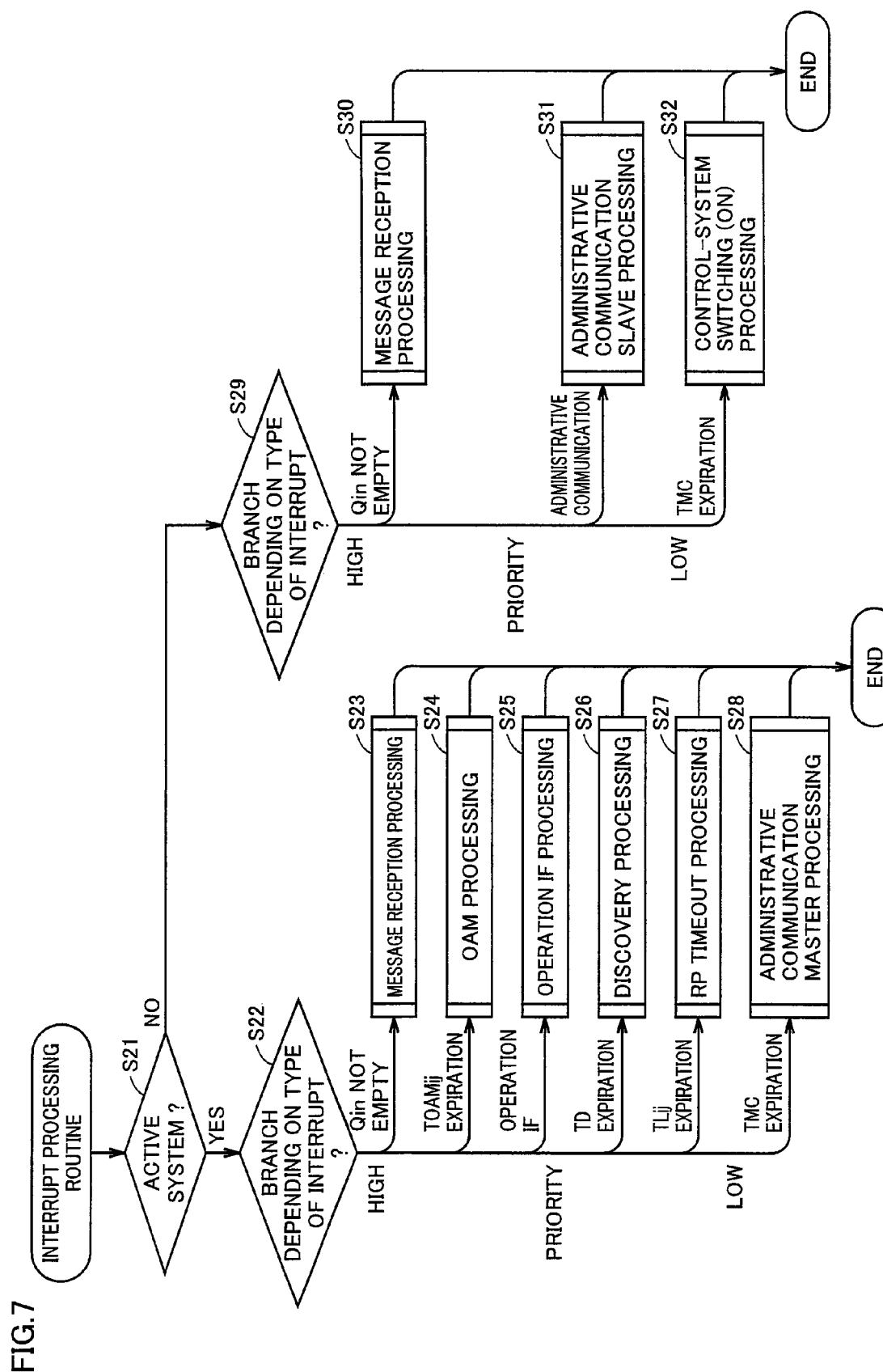
FIG. 7 is a flowchart for illustrating a procedure in an interrupt processing routine performed by the control unit.

FIG. 7 is a flowchart for illustrating a procedure in an interrupt processing routine performed by control unit 14. Since most of processing by control unit 14 is processing that irregularly occurs, interrupt is employed and each interrupt processing is prioritized. In the processing in steps S23 to S28, processing in S23 has highest priority and processing in S28 has lowest priority. In addition, in the processing in steps S30 to S32, processing in S30 has highest priority and processing in S32 has lowest priority.

Initially, when an interrupt occurs, whether control unit 14 is the active control unit or not is determined (S21). When control unit 14 is the active control unit (S21, Yes), the process branches depending on a type of interrupt (S22). When the type of interrupt indicates that a message is present in an ingress message queue (S22, Qin not empty), message reception processing is performed (S23) and the process ends.

When the type of interrupt indicates expiration of an OAM processing start-up timer TOAMij (S22, TOAMij expiration), OAM processing is performed (S24) and the process ends. On the other hand, when the type of interrupt is an interrupt from the operation IF (S22, operation IF), operation IF processing is performed (S25) and the process ends.

When the type of interrupt indicates expiration of the discovery timer (TD) (S22, TD expiration), discovery processing is performed (S26) and the process ends. On the other hand, when the type of interrupt indicates expiration of a timer TLij (S22, TLij expiration), report (RP) timeout processing is performed (S27) and the process ends. On the other hand, when the type of interrupt indicates expiration of administrative communication timer TMC (S22, TMC expiration), administrative communication master processing is performed (S28) and the process ends.

When control unit 14 is the stand-by control unit in step S21 (S21, No), the process branches depending on a type of interrupt (S29). When the type of interrupt indicates that a message is present in an ingress message queue (S29, Qin not empty), message reception processing is performed (S30) and the process ends.

When the type of interrupt indicates administrative communication (S29, administrative communication), administrative communication slave processing is performed (S31) and the process ends. On the other hand, when the type of interrupt indicates expiration of administrative communication timer TMC (S29, TMC expiration), control-system switching (ON) processing is performed (S32) and the process ends.

Figure 8:
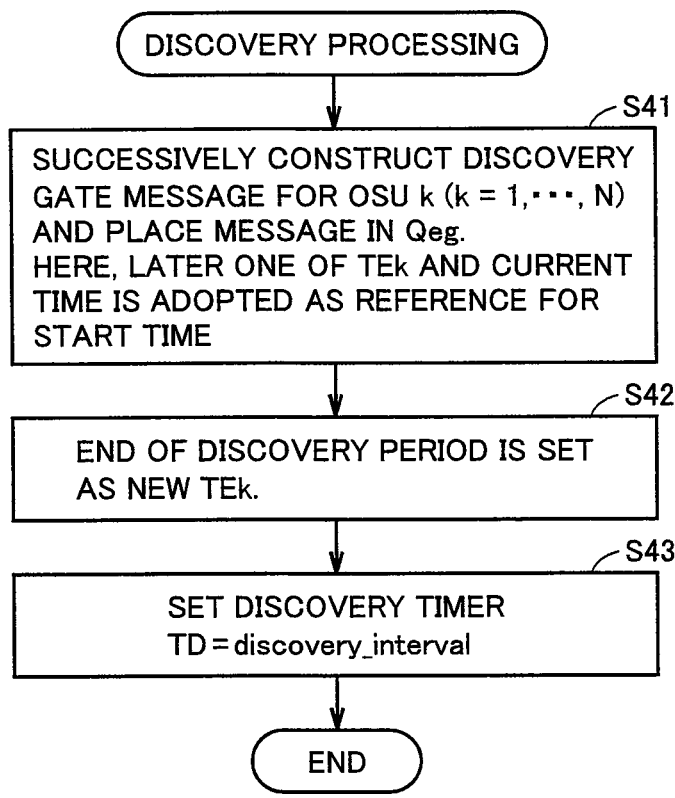
FIG. 8 is a flowchart for illustrating details of discovery processing (S26) shown in FIG. 7.

FIG. 8 is a flowchart for illustrating details of the discovery processing (S26) shown in FIG. 7. The discovery processing may not be performed if all contracted logical links are in a registered state. In addition, when all logical links contracting with a certain PON are in a registered state, transmission of a discovery gate message to that PON (a virtual OSU) may be skipped in steps S41 and S42.

Initially, CPU 51 successively constructs a discovery gate message for an OSU k (k=1, 2, ..., N) and places the result in egress message queue Qeg. Here, any later one of TEk and the current time is adopted as the reference for a start time (S41). Then, CPU 51 sets an end of a discovery period as new TEk (S42). Namely, arrangement of a discovery window is determined with later one of immediately preceding TEk and the current time serving as the reference, taking into account a conceivable range of RTT, a congestion state of registration requests, and the like.

Finally, CPU 51 sets discovery timer TD (S43) and the process ends. A value set for discovery timer TD is discovery_interval which is a predetermined period. Namely, a discovery gate message for an OSU is successively issued in a prescribed cycle.

Figure 9:
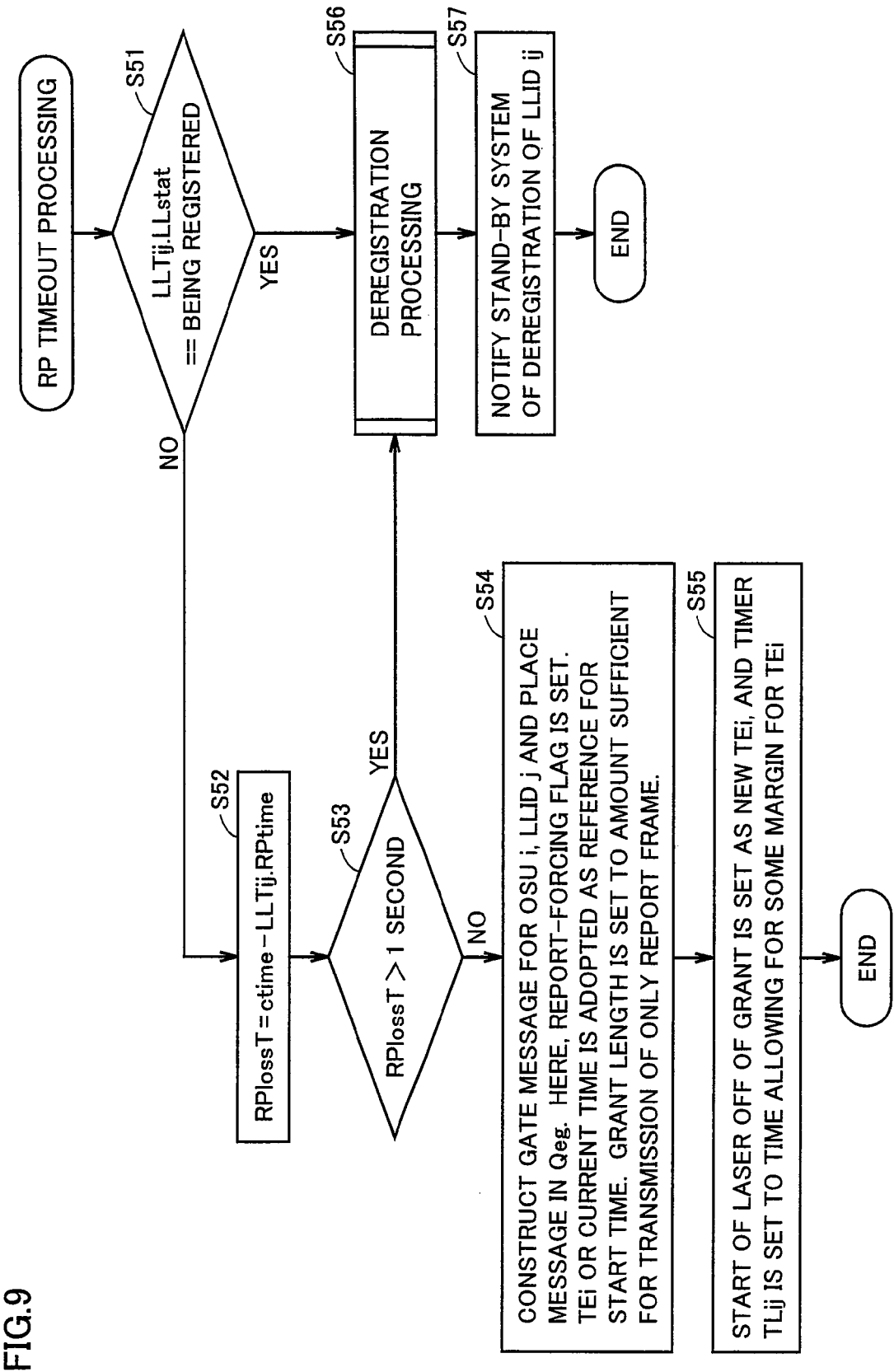
FIG. 9 is a flowchart for illustrating details of RP timeout processing (S27) shown in FIG. 7.

FIG. 9 is a flowchart for illustrating details of the RP timeout processing (S27) shown in FIG. 7. This RP timeout processing is processing when timer TLij had expired because a report message was not received during a reception window period.

Initially, CPU 51 determines whether the logical link is being registered or not, by referring to LLstat of LLTij (S51). When the logical link is not being registered (S51, No), CPU 51 substitutes a value obtained by subtracting most recent report reception time RPtime from current time ctime into RPlossT (S52). This RPlossT represents lapse of time since the most recent report reception time.

When RPlossT is greater than 1 second (553, Yes), the process proceeds to step S56. On the other hand, when RPlossT is not greater than 1 second (S53, No), CPU 51 constructs a gate message for OSU i, LLID j in order to receive again a report message from logical link j, and places the result in egress message queue Qeg. Here, a report-forcing flag is set. CPU 51 allocates a reception window, with TEi or the current time serving as the reference for the start time and with a grant length thereof being set to an amount sufficient for transmission of only a report frame (S54).

Then, CPU 51 sets start of laser off of the grant as new TEi and sets timer TLij to the time allowing for some margin for TEi (S55), and the process ends.

When the logical link is being registered in step S51 (S51, Yes), CPU 51 performs deregistration processing which will be described later (S56) and notifies the stand-by control unit of deregistration of LLID ij (S57), and the process ends.

Figure 10:
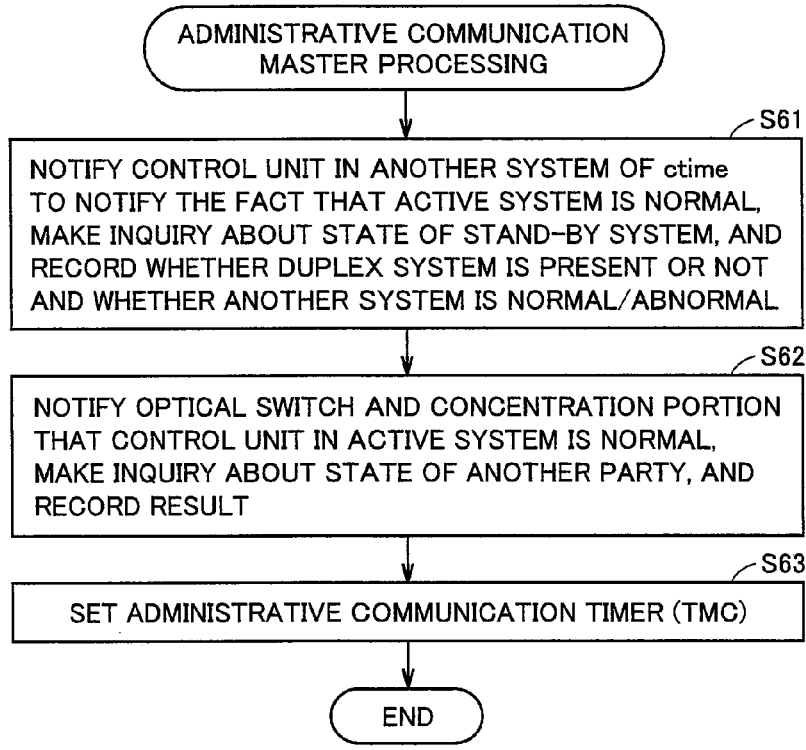
FIG. 10 is a flowchart for illustrating details of administrative communication master processing (S28) shown in FIG. 7.

FIG. 10 is a flowchart for illustrating details of the administrative communication master processing (S28) shown in FIG. 7. Initially, CPU 51 notifies the control unit in another system (the stand-by system) of current time ctime to notify that the active-system is normal, and inquires of the stand-by control unit about its state and records whether a duplex system is present or not and whether another system (the stand-by system) is normal/abnormal (S61).

Then, CPU 51 notifies optical switch 11a and concentration portion 13a that the active control unit is normal, makes inquiry about a state of optical switch 11a and concentration portion 13a, and records the result (S62). Finally, CPU 51 sets the administrative communication timer (TMC) (S63) and the process ends.

Figure 11:
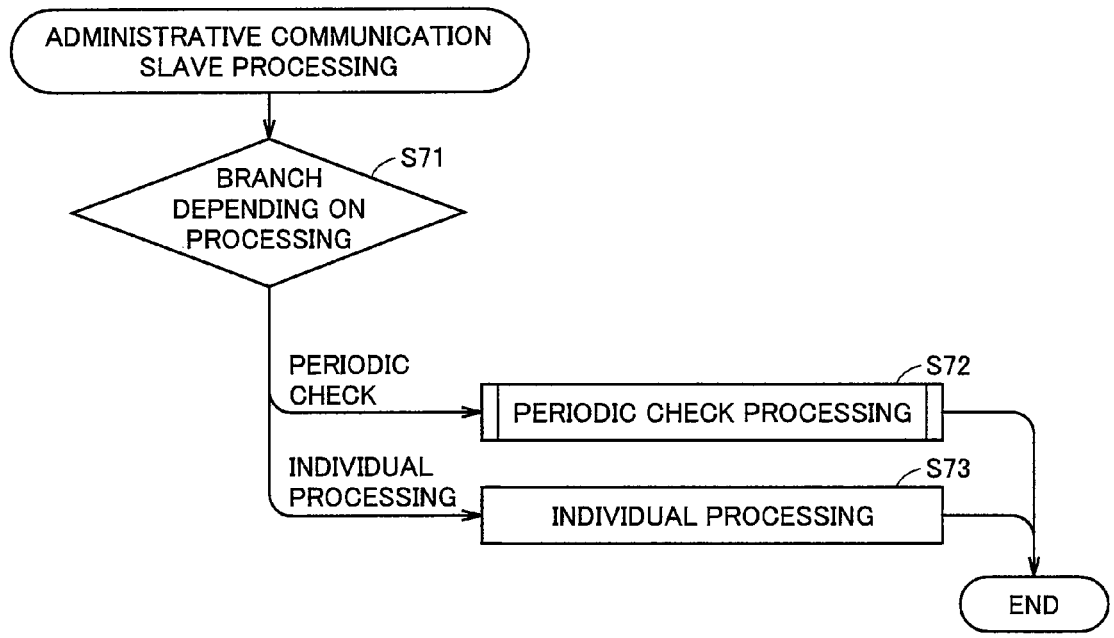
FIG. 11 is a flowchart for illustrating details of administrative communication slave processing (S31) shown in FIG. 7.

FIG. 11 is a flowchart for illustrating details of the administrative communication slave processing (S31) shown in FIG. 7. Whether processing is periodic check processing or individual processing is determined (S71). When the processing is the periodic check processing (S71, periodic check), the periodic check processing is performed (S72) and the process ends. This periodic check processing responds to an inquiry about a state of the stand-by system shown in step S61 in the administrative communication master processing in FIG. 10.

On the other hand, when the processing is the individual processing (S71, individual processing), the individual processing is performed (S73) and the process ends. The individual processing includes administrative communication processing for synchronizing a state of the stand-by system with that of the active system and a system switching instruction. Details of such processing will be described later.

Figure 12:
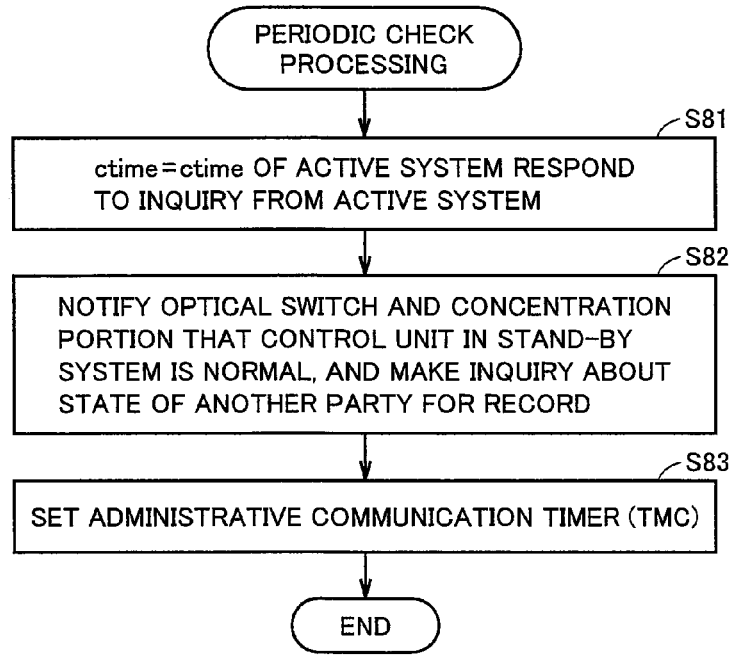
FIG. 12 is a flowchart for illustrating details of periodic check processing (S72) shown in FIG. 11.

FIG. 12 is a flowchart for illustrating details of the periodic check processing (S72) shown in FIG. 11. Initially, CPU 51 sets current time ctime of the active system received from the active control unit as current time ctime of the stand-by system so as to set the clock to that of the active system, and responds to an inquiry from the active control unit (S81).

Finally, CPU 51 notifies optical switch 11a and concentration portion 13a that the stand-by control unit is normal, makes an inquiry about a state of optical switch 11a and concentration portion 13a, records the result (S82), and sets the administrative communication timer (TMC) (S83), and the process ends.

Figure 13:
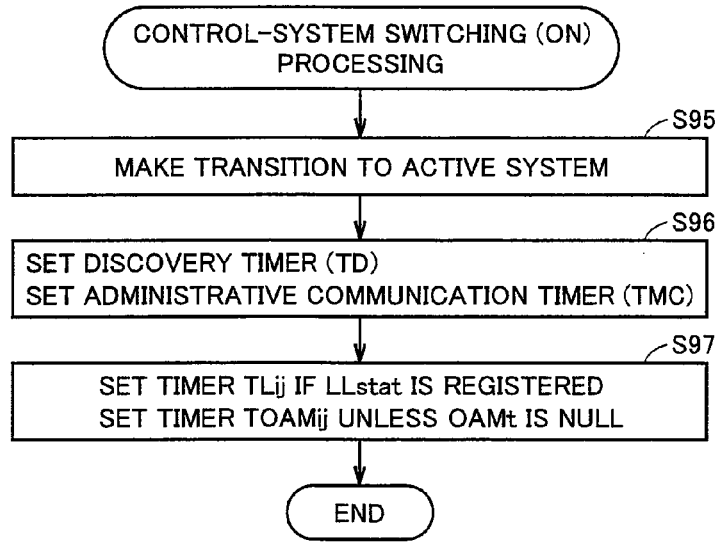
FIG. 13 is a flowchart for illustrating details of control-system switching (ON) processing (S32) shown in FIG. 7.

FIG. 13 is a flowchart for illustrating details of the control-system switching (ON) processing (S32) shown in FIG. 7.

In the control-system switching (ON) processing, CPU 51 makes transition to processing in the active system (S95), sets the discovery timer (TD), and sets the administrative communication timer (TMC) (S96).

Then, CPU 51 sequentially checks LLTij (i=1, 2, ..., N: j∈{LLID of OSU i}), and if LLstat has already been registered, timer TLij is set. In addition, if OAMt is not NULL, OAM processing start-up timer TOAMij is set (S97), and the process ends.

Here, a value set in timer TLij is a value obtained by adding an upper limit value of a bandwidth allocation cycle to current time ctime, and a value set in OAM processing start-up timer TOAMij is a value obtained by adding OAMmaxinterval (which will be described later) to current time ctime.

Figure 14:
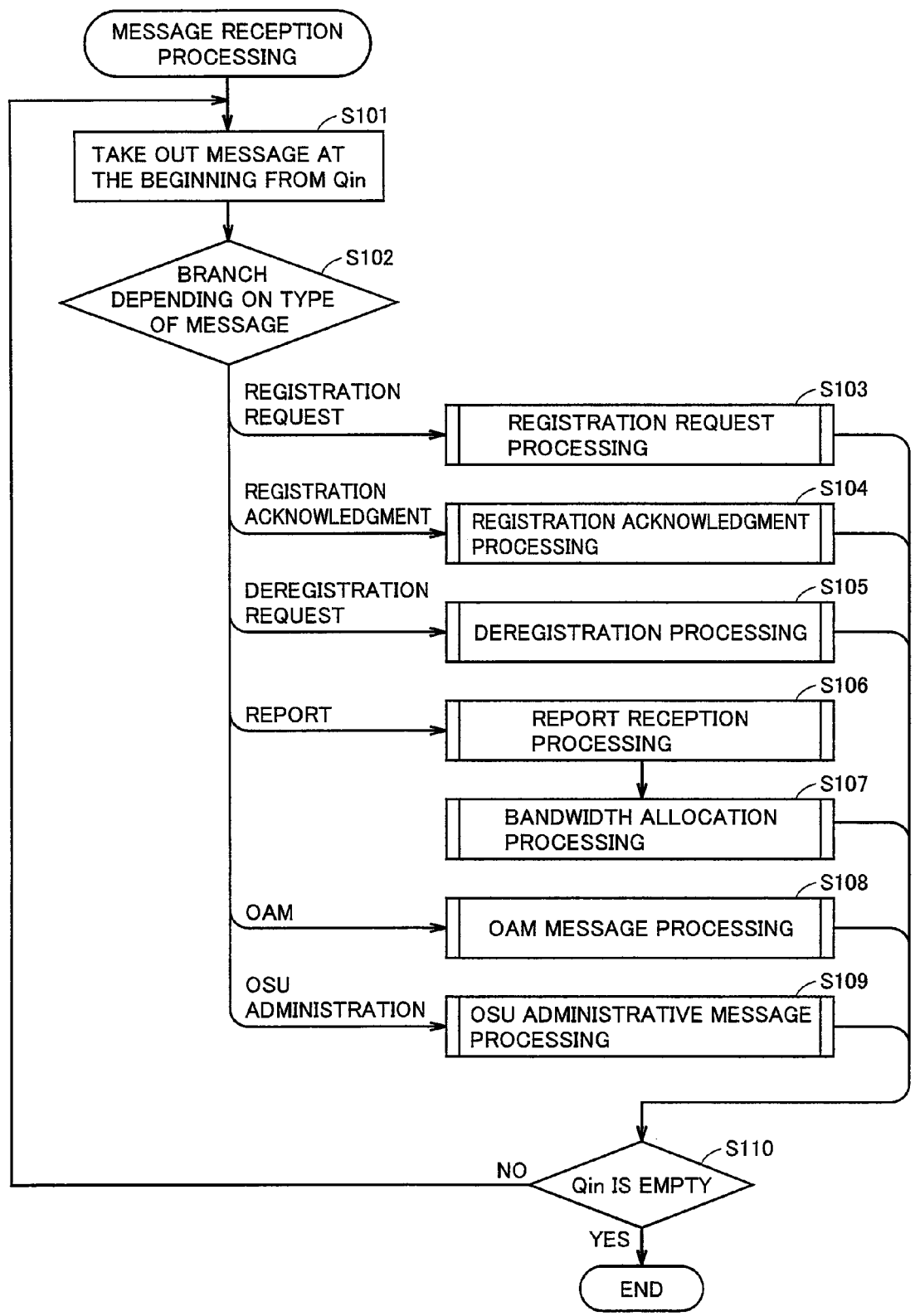
FIG. 14 is a flowchart for illustrating details of message reception processing (S23) shown in FIG. 7.

FIG. 14 is a flowchart for illustrating details of the message reception processing (S23) shown in FIG. 7. Initially, a message at the beginning is taken out of ingress message queue Qin (S101) and the processing branches depending on a type of message (S102).

When the type of message is a registration request message (S102, registration request), registration request processing is performed (S103) and the process proceeds to step S110. When the type of message is a registration acknowledgment message (S102, registration acknowledgment), registration acknowledgment processing is performed (S104) and the process proceeds to step S110.

When the type of message is a deregistration request message (S102, deregistration request), deregistration processing is performed (S105) and the process proceeds to step S110. When the type of message is a report message (S102, report), report reception processing is performed (S106), bandwidth allocation processing is performed (S107), and the process proceeds to step S110.

When the type of message is an OAM message (S102, OAM), OAM message processing is performed (S108) and the process proceeds to step S110. When the type of message is an OSU administrative message (S102, OSU administration), OSU administrative message processing is performed (S109) and the process proceeds to step S110.

Whether ingress message queue Qin is empty or not is determined in step S110. When the ingress message queue is not empty (S110, No), the process returns to step S101, a next message is taken out, and subsequent processing is performed. On the other hand, when ingress message queue Qin is empty (S110, Yes), the process ends.

Figure 15:
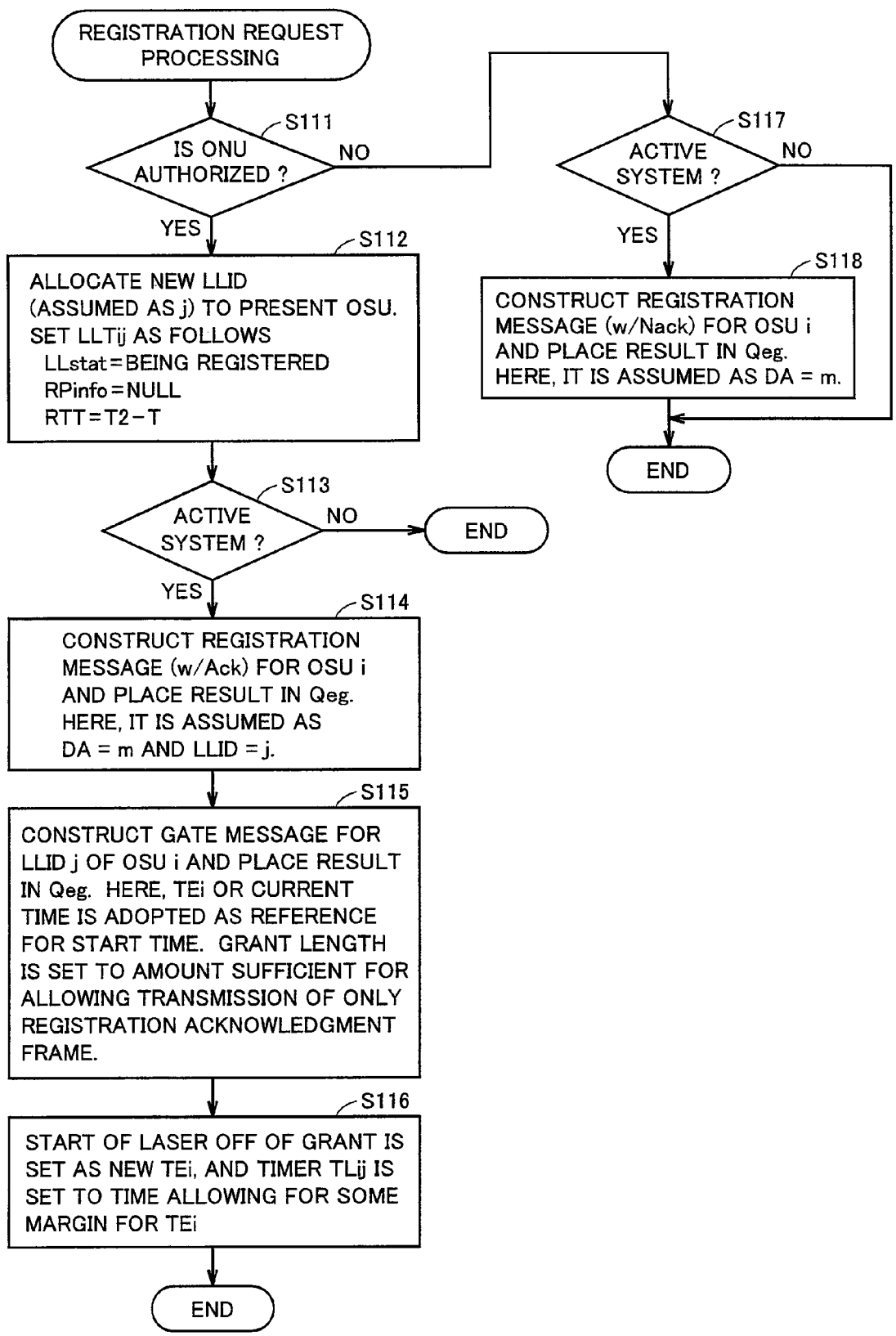
FIG. 15 is a flowchart for illustrating details of registration request processing (S103) shown in FIG. 14.

FIG. 15 is a flowchart for illustrating details of the registration request processing (S103) shown in FIG. 14. When a registration request message from OSU i and a subscriber device having a MAC address m is received, initially, whether a sender ONU is authorized or not is determined (S111).

When sender ONU is authorized (S111, Yes), CPU 51 allocates new LLID j to OSU i. Then, CPU 51 sets logical link state LLstat of LLTij to being registered, sets report information RPinfo to NULL, and sets (T2-T1) as round trip propagation time period RTT (S112). Here, T1 represents a time stamp recorded in a message by a subscriber device, and T2 represents a time stamp added by OSU i at the time of reception.

Then, whether the control unit is the active control unit or not is determined (S113). When the control unit is the stand-by control unit (S113, No), the process ends without further processing being performed.

On the other hand, when the control unit is the active control unit (S113, Yes), CPU 51 constructs a registration message (w/Ack) for OSU i and places the result in egress message queue Qeg (S114). Here, a destination address DA of a registration message is set as m and LLID is set as j. It is noted that (w/Ack) indicates a registration message to which Ack has been added.

Then, CPU 51 constructs a gate message for LLID j of OSU i and places the result in egress message queue Qeg. Here, CPU 51 allocates a reception window, with TEi or the current time serving as the reference for the start time and with a grant length thereof being set to an amount sufficient for transmission of only a registration acknowledgment frame (S115).

A reception window should be arranged in consideration of precision error such that it does not overlap with a reception window of another logical link, even though overlapping of laser on/off is permitted. In addition, a reception window is arranged later than a scheduled transmission time of the gate message by RTT and an ONU processing time period.

Then, CPU 51 sets start of laser off of the grant as new TEi and sets timer TLij to the time allowing for some margin for TEi (S116), and the process ends.

When the ONU is not authorized in step S111 (S111, No) and when the control unit is the active control unit (S117, Yes), CPU 51 constructs a registration message (w/Nack) for OSU i and places the result in egress message queue Qeg. Here, a destination address of a registration message is set as m (S118) and the process ends. On the other hand, when the control unit is the stand-by control unit (S117, No), the process ends without further processing being performed.

Figure 16:
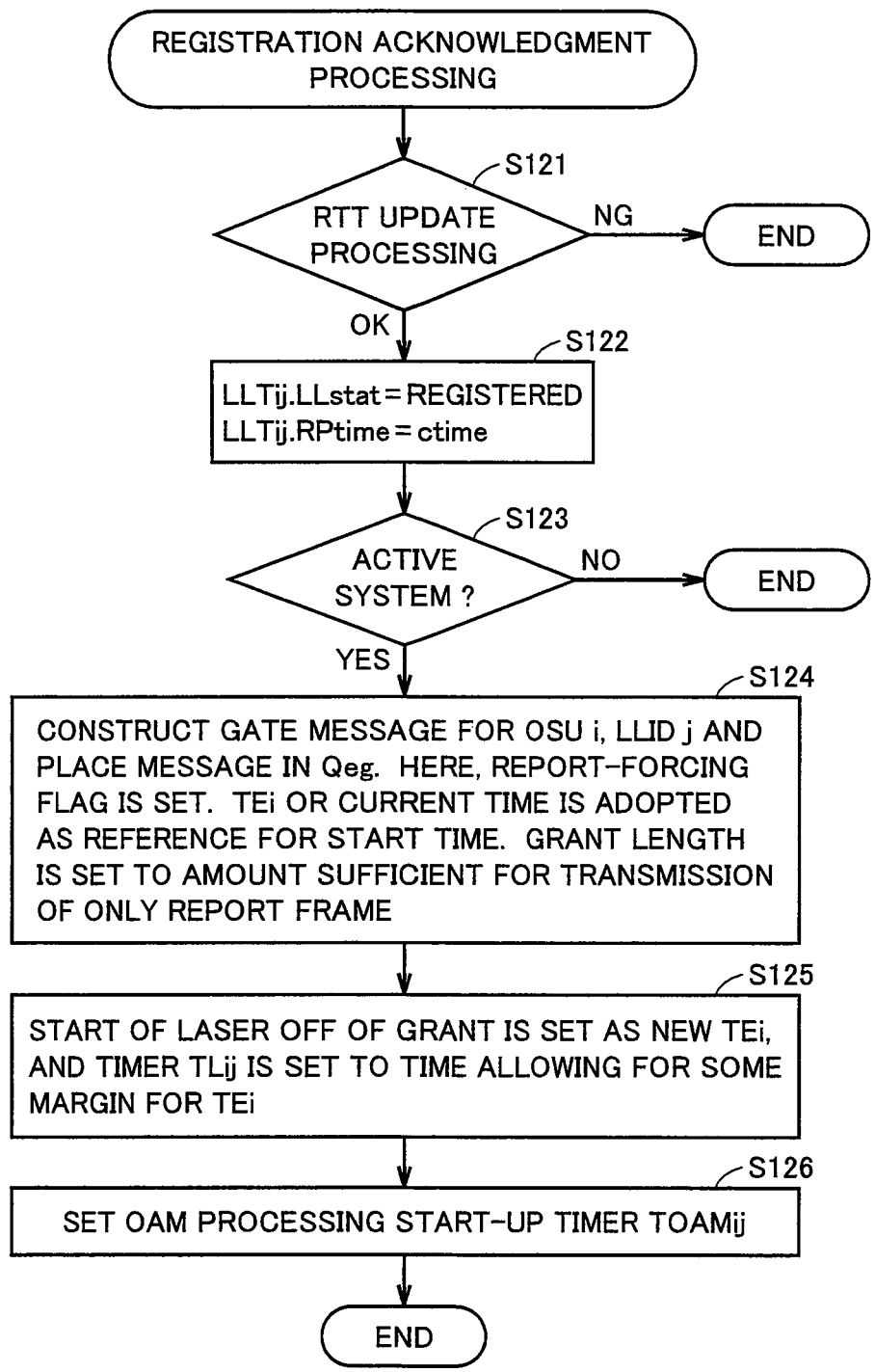
FIG. 16 is a flowchart for illustrating details of registration acknowledgment processing (S104) shown in FIG. 14.

FIG. 16 is a flowchart for illustrating details of the registration acknowledgment processing (S104) shown in FIG. 14. It is assumed that a registration acknowledgment message is received from OSU i, LLID j. Initially, RTT update processing which will be described later is performed and whether the RTT update processing has normally ended or not is determined (S121). When the RTT update processing has not normally ended (S121, NG), the process ends without further processing being performed.

When the RTT update processing has normally ended (S121, OK), CPU 51 sets logical link state LLstat of LLTij to having already been registered and sets most recent report reception time RPtime to current time ctime (S122). Then, whether the control unit is the active control unit or not is determined (S123). When the control unit is the stand-by control unit (S123, No), the process ends without further processing being performed.

On the other hand, when the control unit is the active control unit (S123, Yes), CPU 51 constructs a gate message for OSU i, LLID j and places the result in egress message queue Qeg. Here, a report-forcing flag is set. In addition, CPU 51 allocates a reception window with TEi or the current time serving as the reference for the start time and with a grant length thereof being set to an amount sufficient for transmission of only a report frame (S124).

Then, CPU 51 sets start of laser off of the grant as new TEi and sets timer TLij to the time allowing for some margin for TEi (S125), sets OAM processing start-up timer TOAMij (S126), and the process ends.

Figure 17:
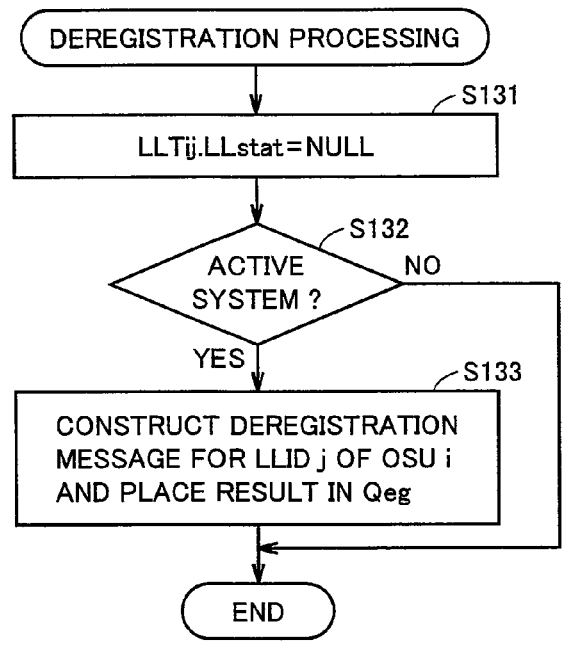
FIG. 17 is a flowchart for illustrating details of deregistration processing (S105) shown in FIG. 14.

FIG. 17 is a flowchart for illustrating details of the deregistration processing (S105) shown in FIG. 14. This processing is performed for deregistering LLID j of OSU i. Initially, CPU 51 sets logical link state LLstat of LLTij to NULL and releases logical link j (S131). Then, when the control unit is the active control unit (S132, Yes), a deregistration message for LLID j of OSU i is constructed, the result is placed in egress message queue Qeg, and the process ends (S133). On the other hand, when the control unit is the stand-by control unit (S132, No), the process ends without further processing being performed.

Figure 18:
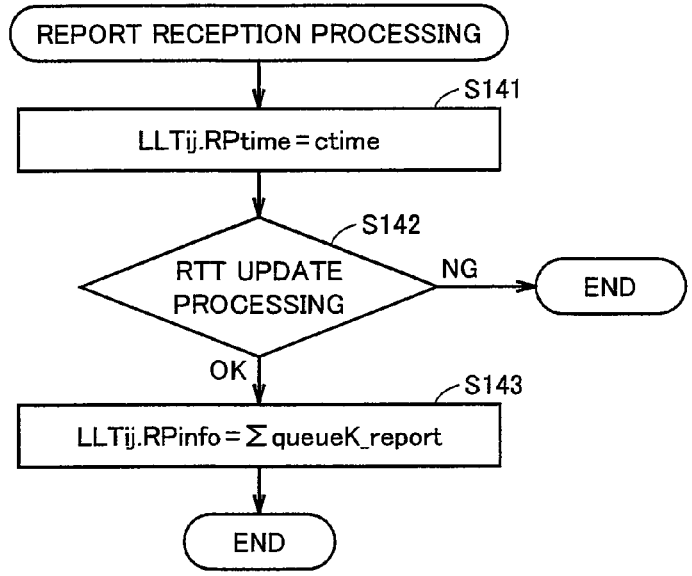
FIG. 18 is a flowchart for illustrating details of report reception processing (S106) shown in FIG. 14.

FIG. 18 is a flowchart for illustrating details of the report reception processing (S106) shown in FIG. 14. This processing is reception of a report from OSU i, LLID j. Initially, CPU 51 sets most recent report reception time RPtime to current time ctime (S141), performs RTT update processing which will be described later, and determines whether the RTT update processing has normally ended or not (S142).

When the RTT update processing has normally ended (S142, OK), CPU 51 substitutes the total of upstream queue lengths queueK_report of an ONU included in report information taken out of ingress message queue Qin into report information RPinfo with regard to LLTij (S143), and the process ends.

On the other hand, when the RTT update processing has not normally ended (S142, NG), the process ends without further processing being performed.

Figure 19:
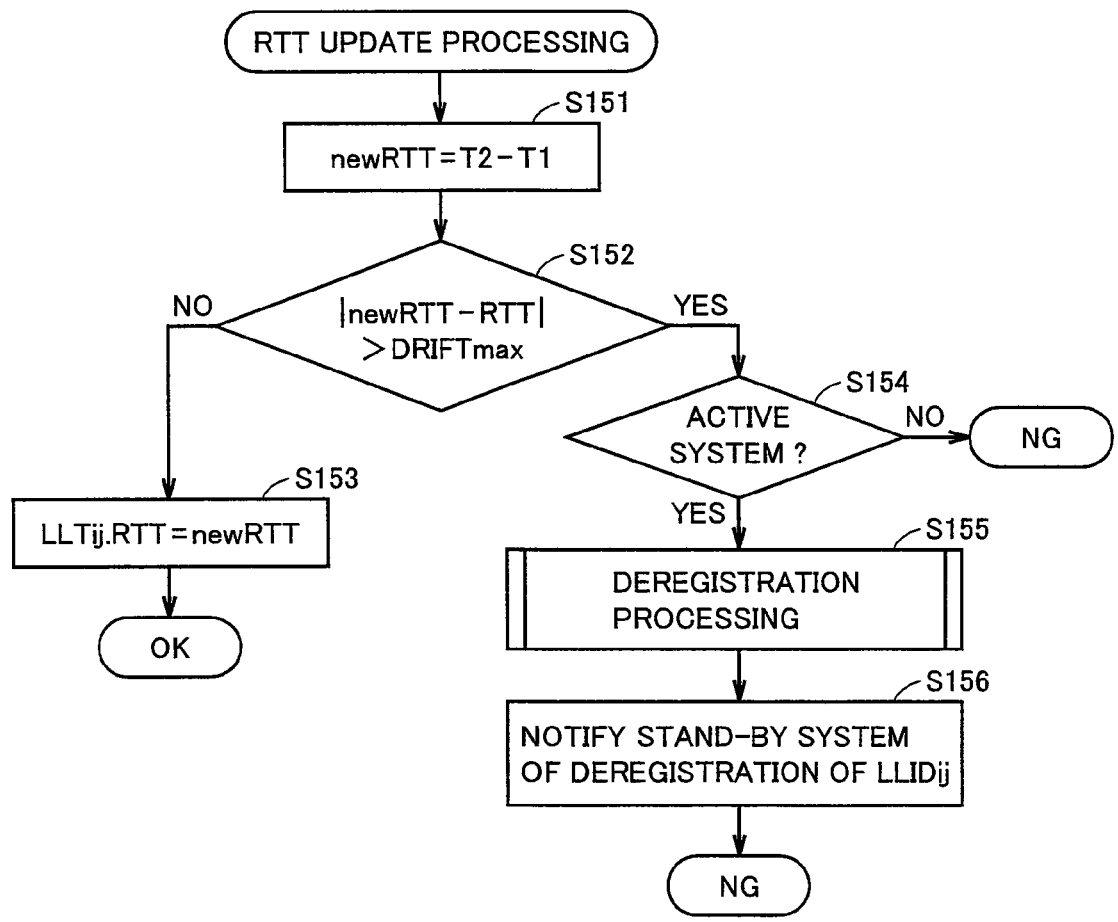
FIG. 19 is a flowchart for illustrating details of RTT update processing.

FIG. 19 is a flowchart for illustrating details of the RTT update processing. Initially, CPU 51 sets a value obtained by subtracting a time stamp T1 recorded in a message by a subscriber device from a time stamp T2 added by OSU i at the time of reception as a new RTT (newRTT) (S151). Then, whether an absolute value of a difference between newRTT and RTT exceeds a tolerable drift value DRIFTmax or not is determined (S152).

When the absolute value is not greater than tolerable drift value DRIFTmax (S152, No), CPU 51 sets RTT of LLTij to newRTT (S153) and the process ends, assuming that the RTT update processing has normally ended. On the other hand, when the absolute value exceeds tolerable drift value DRIFTmax (S152, Yes), whether the control unit is the active control unit or not is determined (S154).

When the control unit is the active control unit (S154, Yes), CPU 51 performs the deregistration processing shown in FIG. 17 (S155) and notifies the stand-by control unit of deregistration of LLID ij (S156), and the process ends assuming that the RTT update processing has not normally ended. On the other hand, when the control unit is the stand-by control unit (S154, No), CPU 51 ends the process without performing further processing, assuming that the RTT update processing has not normally ended.

If a transition period necessary for OSU switching processing (S221) and OSU recovery processing (S222) to switch a path can be referred to and if the time of reception of a control frame is within the transition period, the tolerable drift value may be increased in S152 by adding a margin involved with path switching, or comparison may be invalidated (determination as No is always made in S152).

Figure 20:
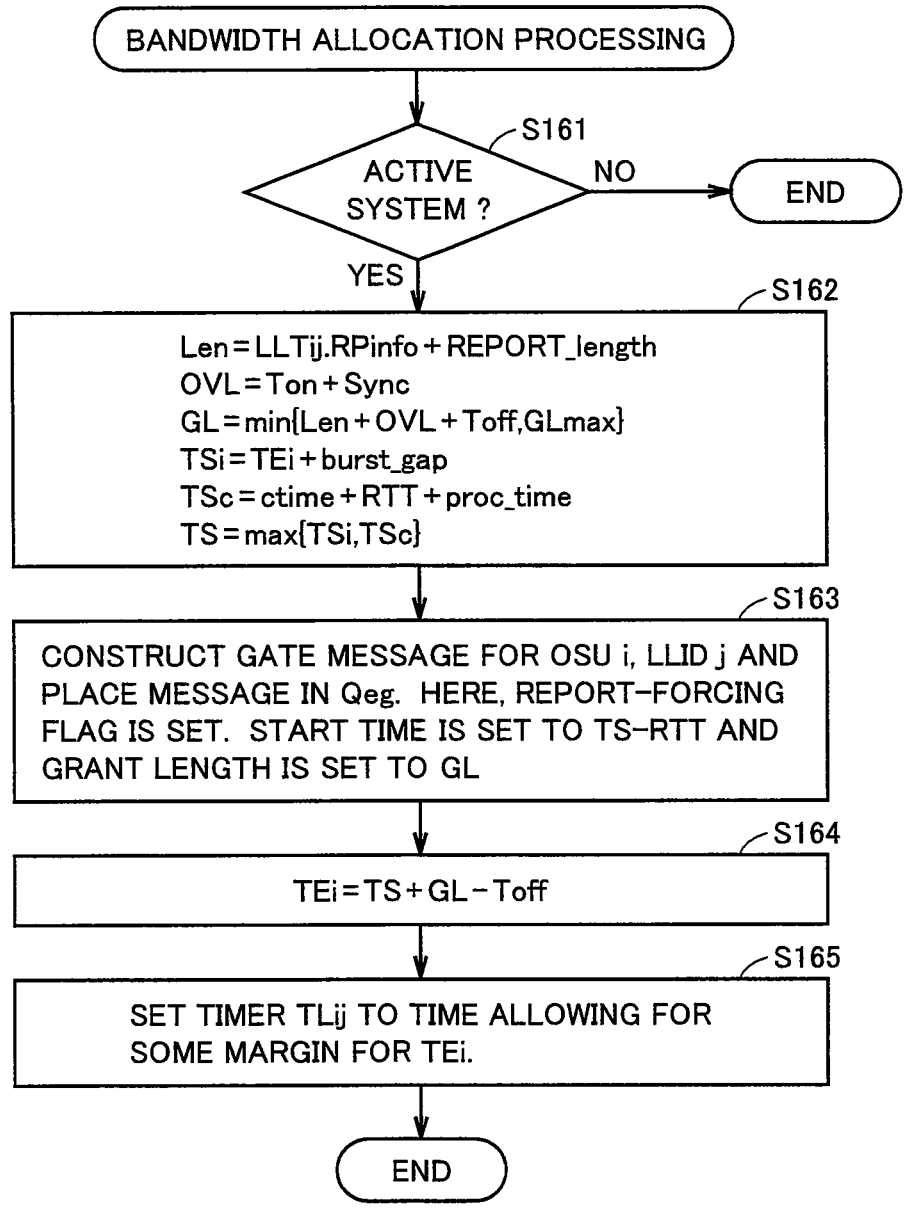
FIG. 20 is a flowchart for illustrating details of bandwidth allocation processing (S107) shown in FIG. 14.

FIG. 20 is a flowchart for illustrating details of the bandwidth allocation processing (S107) shown in FIG. 14. This processing is allocation of a bandwidth to OSU i, LLID j. Initially, CPU 51 adds a time period REPORT_length necessary for sending a report frame to report information RPinfo of LLTij (an up queue length of an ONU) to thereby obtain Len, and adds a synchronization period Sync to a laser ON period Ton to thereby obtain an overhead time OVL. Then, any smaller value of the sum of Len, OVL and laser OFF period Toff and a grant length upper limit value GLmax is set as a grant length GL.

CPU 51 sets the sum of latest allocation time TEi of OSU i and a burst gap burst_gap as TSi and sets the sum of current time ctime, RTT, and a processing time proc_time of the subscriber device as TSc. Then, CPU 51 sets the latest time out of TSi and TSc as TS (S162).

Thereafter, CPU 51 constructs a gate message for OSU i, LLID j and places the message in egress message queue Qeg. Here, a report-forcing flag is set. In addition, CPU 51 allocates a reception window with the start time being set to a value obtained by subtracting RTT from TS and with its grant length being set as GL (S163).

Then, CPU 51 sets a value obtained by subtracting Toff from a value obtained by adding GL to TS as latest allocation time TEi (S164) and sets timer TLij to the time allowing for some margin for TEi (S165), and the process ends.

If a transition period necessary for OSU switching processing (S221) and OSU recovery processing (S222) to switch a path can be referred to, TS may be adjusted so that a grant period and the transition period do not overlap with each other.

In addition, the bandwidth allocation processing may be performed in coordination with a virtual OSU concentrated to the same upper link. In particular, a bandwidth for each PON line is preferably allocated such that an upstream frame output from the virtual OSU can pass without staying in the concentration portion, based on upstream bandwidth allocation for the upper link. Thus, the length/capacity of FIFOs in the concentration portion can be small and a time period for a user frame to pass through the terminal device can be shortened.

In the process of calculating Len above, parity data for error correction may be added.

Figure 21:
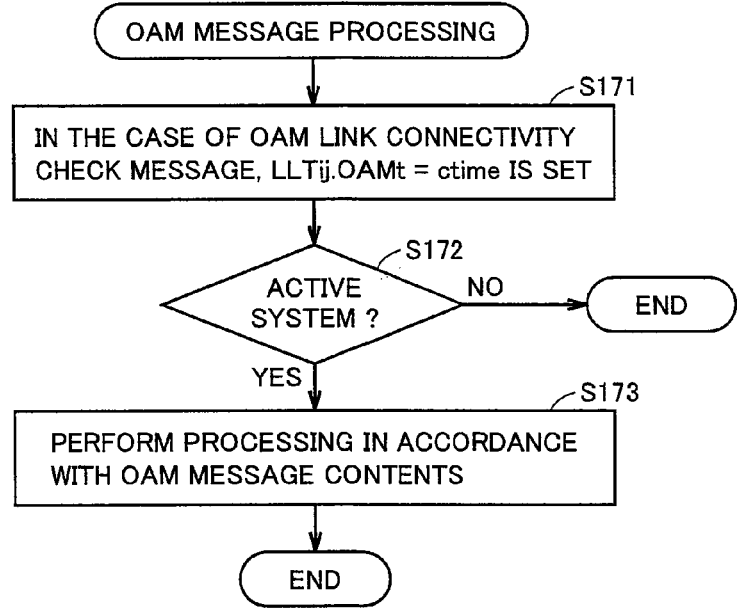
FIG. 21 is a flowchart for illustrating details of OAM message processing (S108) shown in FIG. 14.

FIG. 21 is a flowchart for illustrating details of the OAM message processing (S108) shown in FIG. 14. It is assumed that an OAM message is received from OSU LLID j. Initially, when the OAM message is an OAM link connectivity check message, CPU 51 sets OAMt of LLTij to current time ctime (S171) and determines whether the control unit is the active control unit or not (S172).

When the control unit is not the active control unit (S172, No), the process ends without further processing being performed. On the other hand, when the control unit is the active control unit (S172, Yes), CPU 51 performs processing in accordance with contents in the OAM message (S173) and the process ends.

Figure 22:
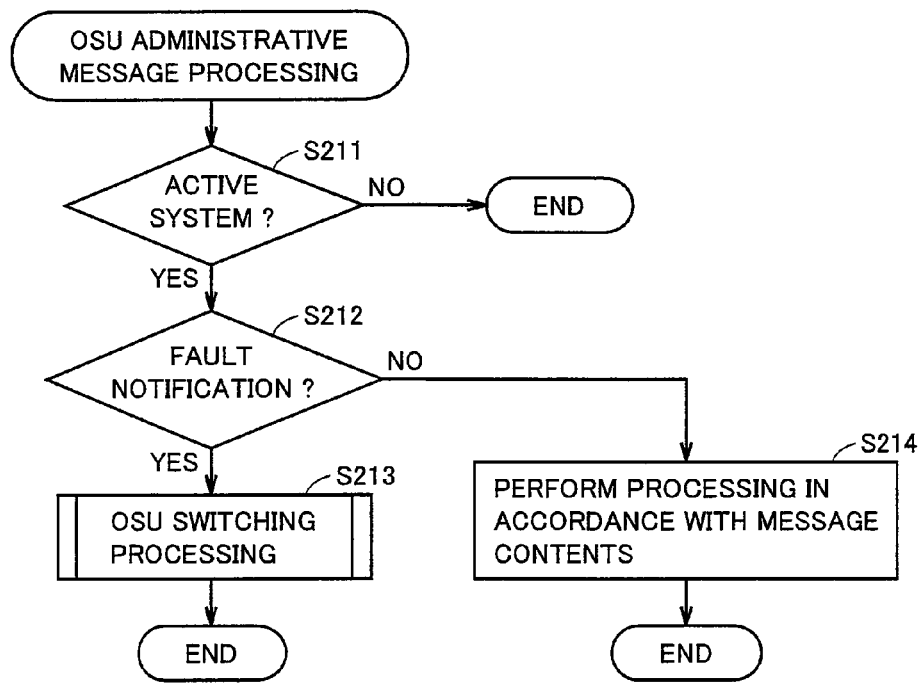
FIG. 22 is a flowchart for illustrating details of OSU administrative message processing (S109) shown in FIG. 14.

FIG. 22 is a flowchart for illustrating details of the OSU administrative message processing (S109) shown in FIG. 14. It is assumed that an OSU administrative message is received from OSU i. Initially, whether the control unit is the active control unit or not is determined (S211). When the control unit is the stand-by control unit (S211, No), the process ends without further processing being performed.

When the control unit is the active control unit (S211, Yes), whether notification of a fault has been issued or not is determined (S212). When notification of a fault has been issued (S212, Yes), CPU 51 performs OSU switching processing which will be described later (S213) and the process ends. On the other hand, when notification of a fault has not been issued (S212, No), CPU 51 performs processing in accordance with contents in the message (S214) and the process ends.

Figure 23:
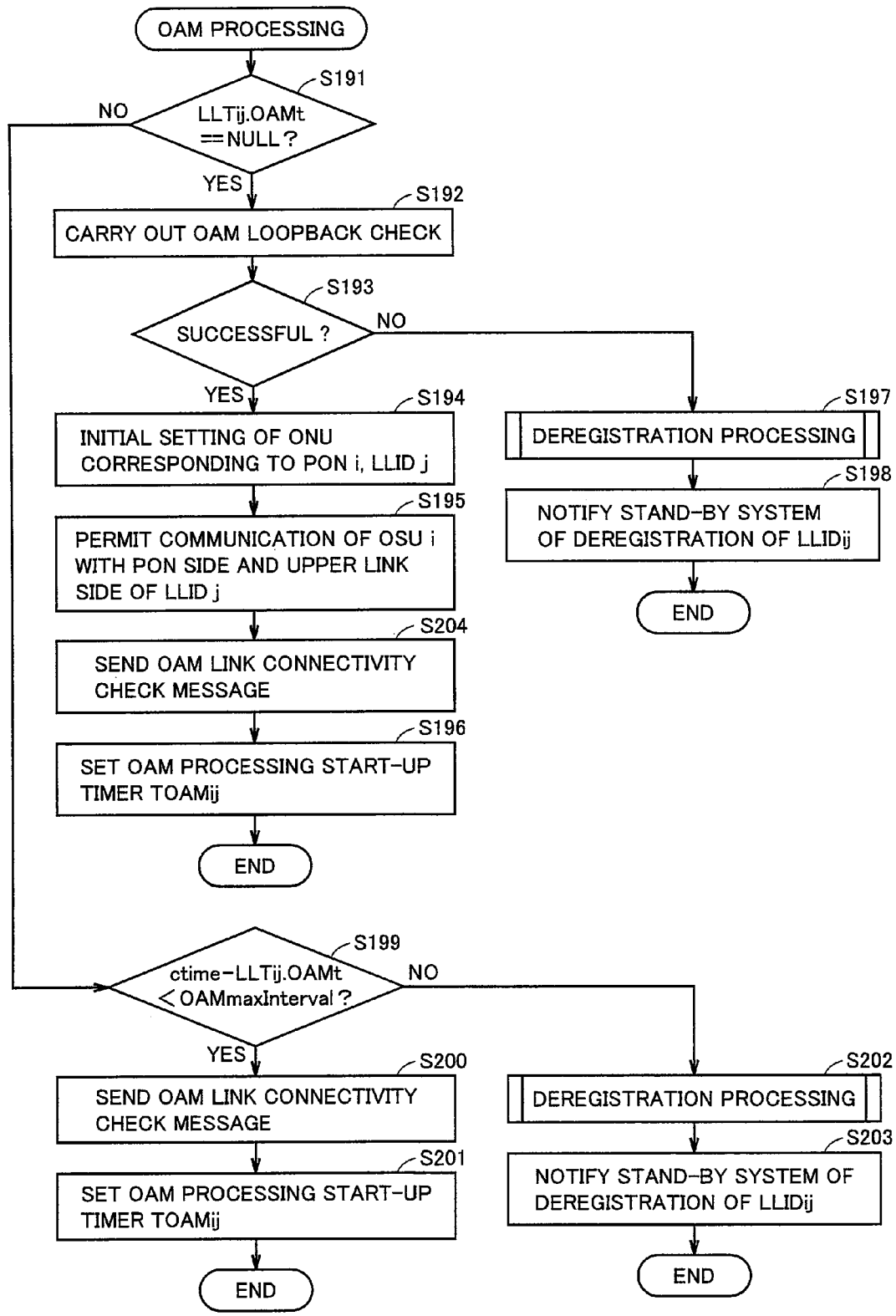
FIG. 23 is a flowchart for illustrating details of OAM processing (S24) shown in FIG. 7.

FIG. 23 is a flowchart for illustrating details of the OAM processing (S24) shown in FIG. 7. This OAM processing is performed independently for each virtual OSU (assumed as i) and each logical link (assumed as j), and it is performed for setting an ONU or checking a state thereof through OAM communication with a corresponding ONU.

Initially, whether OAMt of LLTij is NULL or not is determined (S191). When OAMt of LLTij is NULL (S191, Yes), it indicates that the OAM link is in the initial state. Therefore, the OAM loopback check is carried out (S192) and whether the check was successful or not is determined (S193).

When the OAM loopback check was successful (S193, Yes), CPU 51 makes initial setting of the ONU corresponding to PON i, LLID j (S194) and permits communication of OSU i with the PON side and the upper link side of LLID j (S195). Then, the OAM link connectivity check message is sent and LLID ij.OAMt=ctime is set (S204). Then, CPU 51 sets OAM processing start-up timer TOAMij (S196) and the process ends.

On the other hand, when the OAM loopback check was not successful (S193, No), CPU 51 performs deregistration processing (S197) and notifies the stand-by control unit of deregistration of LLID ij (S198), and the process ends.

When OAMt of LLTij is not NULL in step S191 (S191, No), whether a value obtained by subtracting OAMt of LLTij from current time ctime is smaller than OAMmaxinterval or not is determined (S199). This OAMmaxinterval is predetermined and whether OAM communication has been interrupted or not is determined based on this value.

When the value obtained by subtracting OAMt of LLTij from current time ctime is smaller (S199, Yes), CPU 51 sends the OAM link connectivity check message to ONU i (S200) and sets OAM processing start-up timer TOAMij (S201), and the process ends.

On the other hand, when the value obtained by subtracting OAMt of LLTij from current time ctime is not smaller (S199, No), CPU 51 performs deregistration processing (S202) and notifies the stand-by control unit of deregistration of LLID ij (S203), and the process ends.

Figure 24:
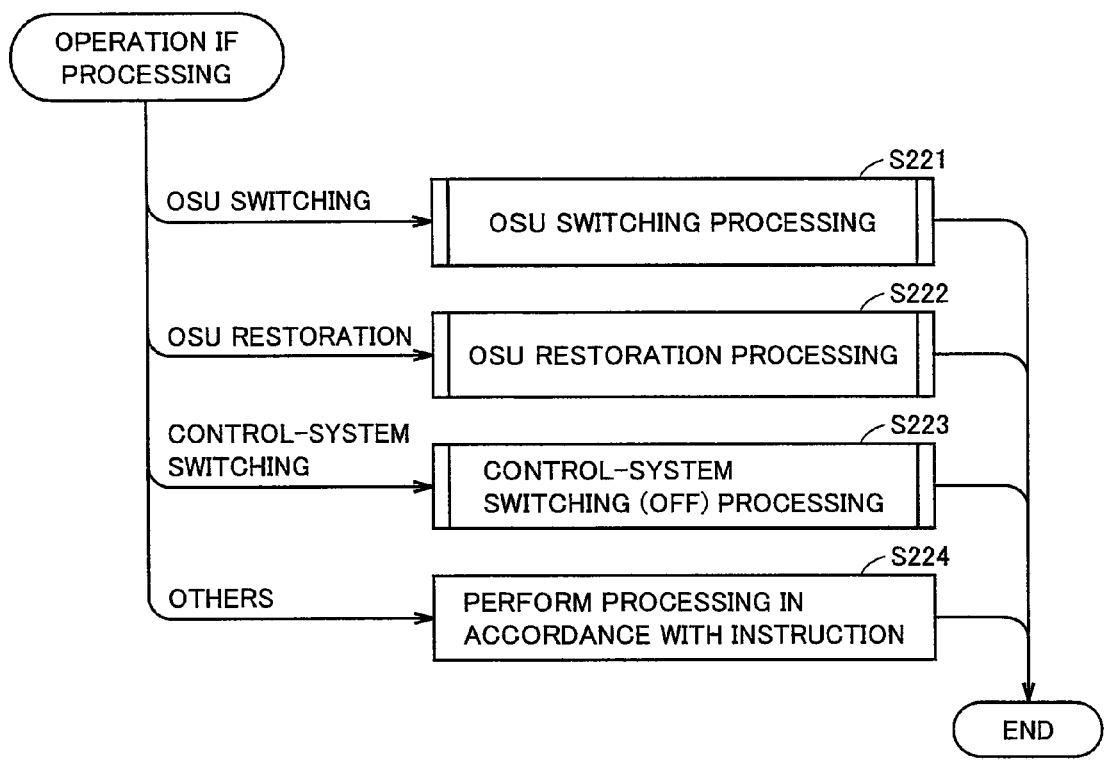
FIG. 24 is a flowchart for illustrating details of operation IF processing (S25) shown in FIG. 7.

FIG. 24 is a flowchart for illustrating details of the operation IF processing (S25) shown in FIG. 7. When an instruction from the operation IF is an OSU switching instruction, CPU 51 performs OSU switching processing (S221) and the process ends.

When the instruction from the operation IF is an OSU recovery instruction, CPU 51 performs OSU recovery processing (S222) and the process ends. When the instruction from the operation IF is a control-system switching instruction, CPU 51 performs control-system switching processing (S223) and the process ends. On the other hand, when the instruction from the operation IF is an instruction otherwise, CPU 51 performs processing in accordance with that instruction (S224) and the process ends.

Figure 25:
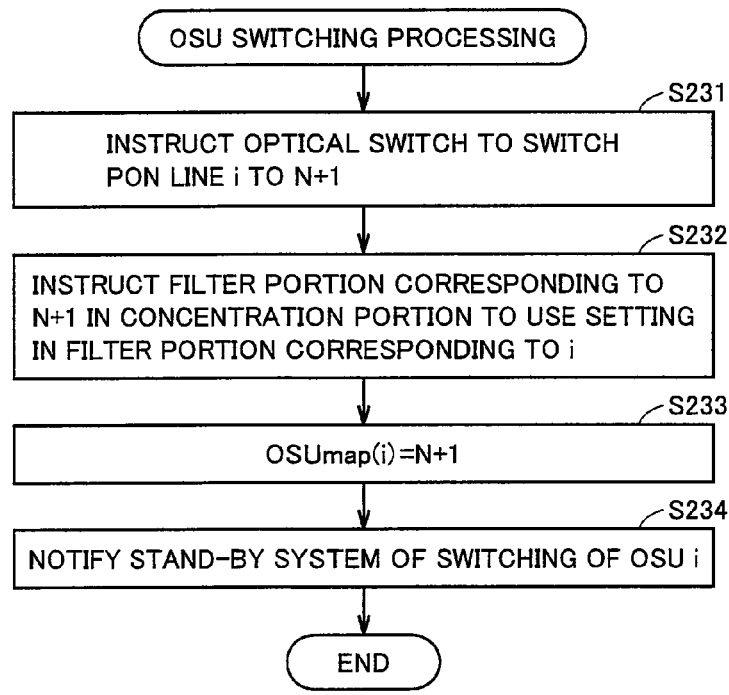
FIG. 25 is a flowchart for illustrating details of OSU switching processing (S221) shown in FIG. 24.

FIG. 25 is a flowchart for illustrating details of the OSU switching processing (S221) shown in FIG. 24. Here, it is assumed that OSU i is switched. Initially, CPU 51 instructs optical switch 11a to switch connection of PON line, from OSU i to OSU N+1 (S231), and instructs concentration portion 13a to change the setting of filter portion N+1 (46a-N+1) in concentration portion 13a to the setting of filter portion i (S232).

Then, CPU 51 makes setting relating to virtual OSU i in OSU mapping to OSUmap(i)=N+1 (S233) and notifies the stand-by control unit of switching of OSU i (S234), and the process ends.

Figure 26:
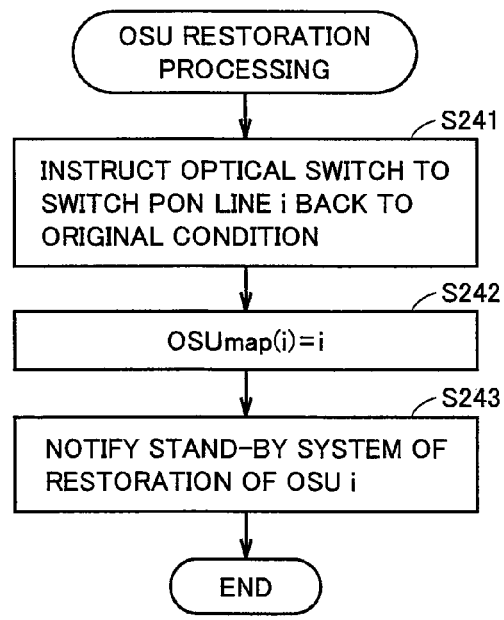
FIG. 26 is a flowchart for illustrating details of OSU restoration processing (S222) shown in FIG. 24.

FIG. 26 is a flowchart for illustrating details of the OSU recovery processing (S222) shown in FIG. 24. Here, it is assumed that OSU i is recovered. Initially, CPU 51 instructs optical switch 11a to switch connection of PON line i back to original OSU i (S241). Then, CPU 51 makes setting relating to virtual OSU i in OSU mapping to OSUmap(i)=i (S242) and notifies the stand-by control unit of recovery of OSU i (S243), and the process ends.

By recording a transition period in which a path is switched in the OSU switching processing (S221) and the OSU recovery processing (S222) in a global variable or the like, reference may be made from other processing such as the bandwidth allocation processing (S107).

Figure 27:
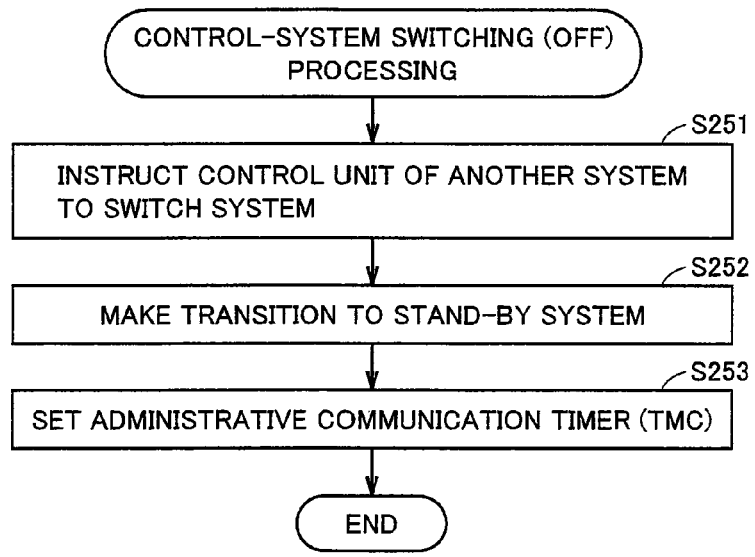
FIG. 27 is a flowchart for illustrating details of control-system switching (OFF) processing (S223) shown in FIG. 24.

FIG. 27 is a flowchart for illustrating details of the control-system switching (OFF) processing (S223) shown in FIG. 24. Initially, CPU 51 issues a system switching instruction to the control unit in another system (the stand-by system) (S251) and transition to the stand-by system is made (S252). Then, CPU 51 sets the administrative communication timer (TMC) (S253) and the process ends.

As described above, according to the terminal device in the present embodiment, since control unit 14 collectively controls OSU 1 to OSU N+1 (12-1 to 12-N+1), cost of the terminal device could be reduced. As a tolerable range of transmission and reception timing of an MPCP frame is great, slight deviation of transmission and reception timing does not give rise to a problem. Therefore, even when a single control unit terminates MPCP frames, it does not particularly give rise to a problem.

In addition, since control unit 14 can make redundancy-adapted switching of an OSU simply by changing a communication path while a state of registration of ONUs is maintained, redundancy-adapted switching can quickly be made and there is no influence by abnormality of an OSU.

Moreover, since redundancy-adapted switching can be made simply by preparing a single stand-by OSU for N OSUs, fault-resilient performance could be improved without significantly lowering cost effectiveness.

Second Embodiment

Figure 28:
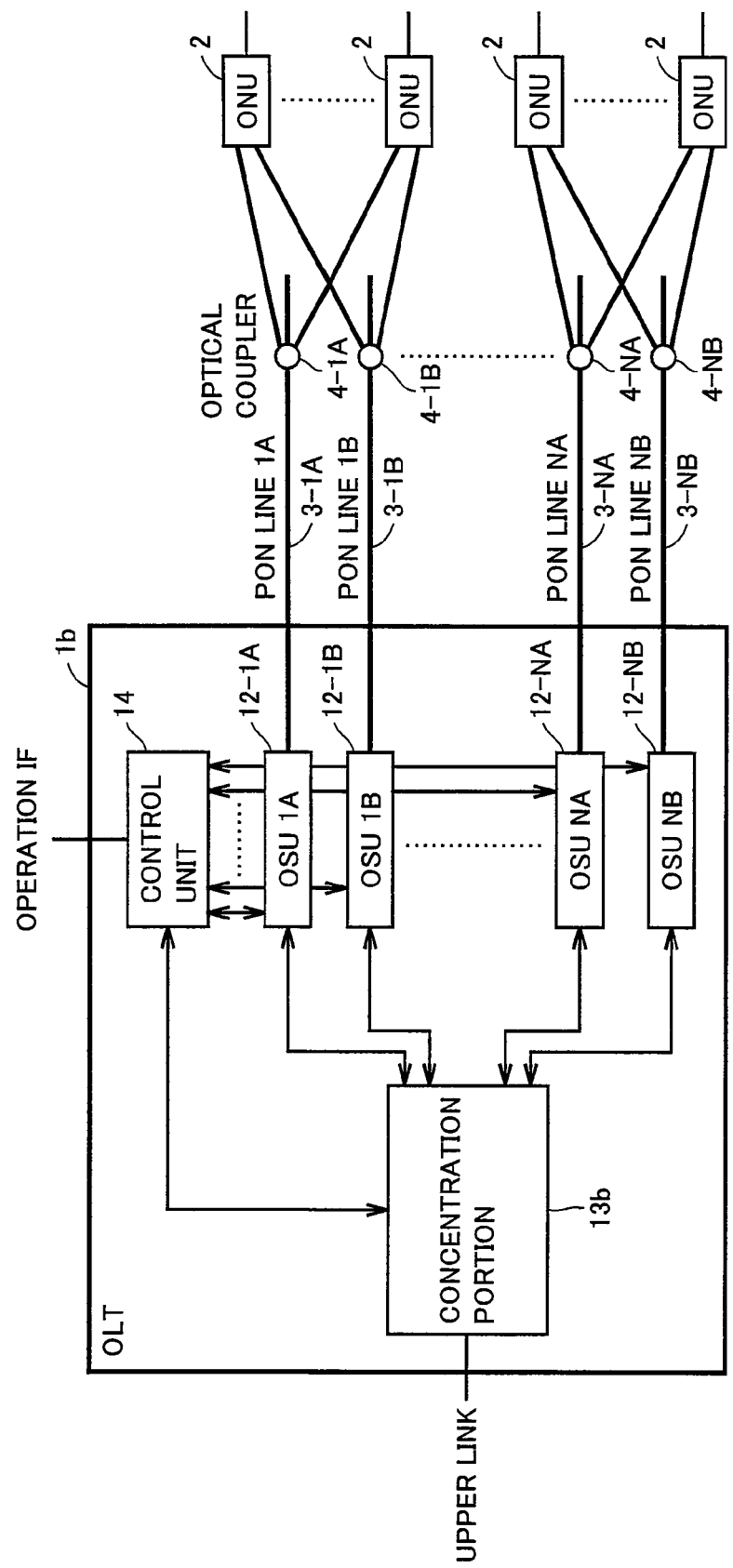
FIG. 28 is a block diagram showing a schematic configuration of a terminal device in a second embodiment of the present invention.

FIG. 28 is a block diagram showing a schematic configuration of a terminal device in a second embodiment of the present invention. In this terminal device 1b, OSUs and PON lines are duplexed, and one ONU 2 is connected to two OSUs through different PONS. In addition, terminal device 1b has 2N OSUs and can terminate N sets of duplex PON lines. It is noted that the duplex OSUs and PON lines are divided into two systems of an A system and a B system, with OSUs and PON lines in the A system being labeled with "A" and OSUs and PON lines in the B system being labeled with "B".

Terminal device 1b includes OSUs 1A to NA (12-1A to 12-NA) and OSUs 1B to NB (12-1B to 12-NB), a concentration portion 13b, and control unit 14 for overall control of terminal device 1b. It is noted that each OSU is configured similarly to the OSU in the first embodiment shown in FIG. 3.

Figure 29:
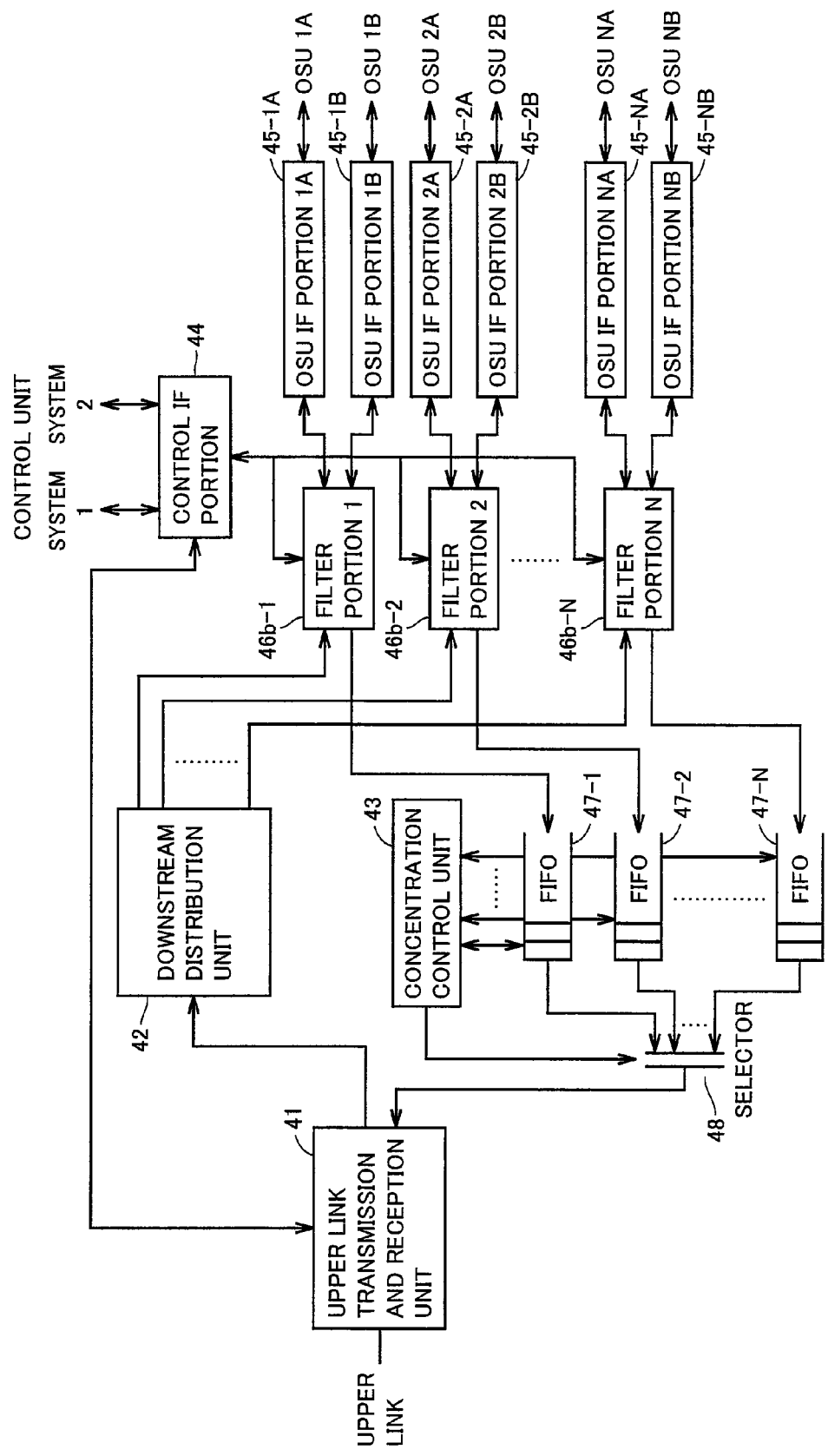
FIG. 29 is a block diagram showing an exemplary configuration of a concentration portion in the second embodiment of the present invention.

FIG. 29 is a block diagram showing an exemplary configuration of concentration portion 13b in the second embodiment of the present invention. Concentration portion 13b is different from concentration portion 13a in the first embodiment shown in FIG. 4 in that the number of filter portions and FIFOs is set to N, the number of OSU IF portions is set to 2N, and each of filter portions 1 to N (46b-1 to 46b-N) is connected to an OSU IF portion in the A system and an OSU IF portion in the B system. Which path of the A system and the B system is to be adopted as the active system for filter portions 1 to N (46b-1 to 46b-N) and which path thereof is to be adopted as the stand-by system is determined based on control by control unit 14 through control IF portion 44. In default setting, the A system is active and OSU mapping is set to (virtual OSU i ⇔ actual OSU iA).

Filter portions 1 to N (46b-1 to 46b-N) cause an active path to be connected and a stand-by path to be disconnected in a downstream direction. In addition, they cause paths of both systems to be connected in an upstream direction. This redundant configuration is hereinafter referred to as "1:1 redundant configuration."

In addition, regarding an example where paths of both systems are connected in a downstream direction and an active path is connected and a stand-by path is disconnected in an upstream direction, this redundant configuration is referred to as "1+1 redundant configuration."

Control unit 14 assumes N virtual OSUs and associates a virtual OSU i with an actual OSU in the active system by OSU mapping. Namely, any of OSU iA and OSU iB is associated with OSU i. Control unit 14 makes redundancy-adapted switching of an OSU in accordance with the following procedure.

Initially, an OAM message giving an ONU advance notice of system switching is sent to virtual OSU i. Namely, broadcasting to operating ONUs is made through PON line iA. Then, concentration portion 13b is instructed through IO control unit 54 to make setting of path connection/path disconnection of the filter portion in concentration portion 13b such that the A system is set as the stand-by system and the B system is set as the active system.

Then, the setting relating to virtual OSU i M OSU mapping is changed to (virtual OSU i ⇔ actual OSU iB). Then, an OAM message notifying the ONU of system switching is sent again to virtual OSU i. Namely, the OAM message is broadcast through PON line iB.

An operation of control unit 14 above is adapted to the 1:1 redundant configuration, however, it may also be adapted to the 1+1 redundant configuration. In this case, control unit 14 directly interfaces with 2N actual OSUs without performing OSU mapping, establishes and operates logical links and OAM links with each set of duplex OSUs, separately for the A system and the B system, and communicates user frames.

In addition, as a configuration intermediate between the 1:1 redundant configuration and the 1+1 redundant configuration, a configuration may also be such that a logical link and an OAM link are established with the stand-by system and maintained but a user frame is not allowed to pass. In this case, only MPCP frames and OAM frames are transmitted to a stand-by PON line.

In the case of this redundant configuration and the 1+1 redundant configuration, the active system may be determined based on comparison of the number of established links.

As described above, according to terminal device 1b in the present embodiment, in addition to the effects described in the first embodiment, redundancy of the PON line can also be achieved and fault-resilient performance could further be improved.

Figure 30:
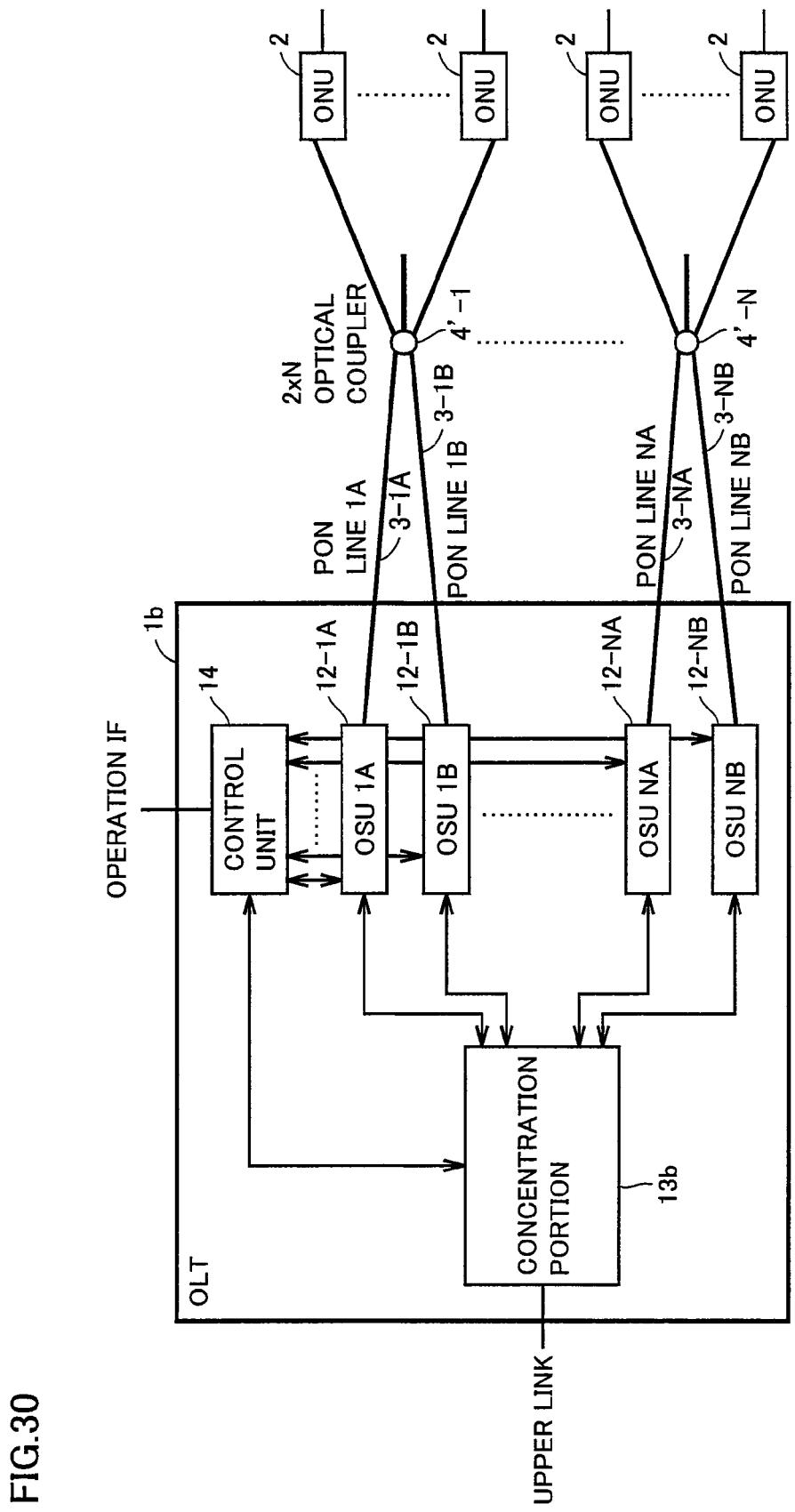
FIG. 30 is a block diagram showing another exemplary configuration of the terminal device in the second embodiment of the present invention.

It is noted that a configuration shown in FIG. 30 is also possible as a variation of the 1:1 redundant configuration in the present embodiment. This configuration employs a 2×N-type optical coupler, a PON line down side of the coupler configures a simplex system, but OSUs configure a duplex system. Only fault-resilient performance of OSUs can be improved without much increase in cost for PON lines.

Third Embodiment

Figure 31:
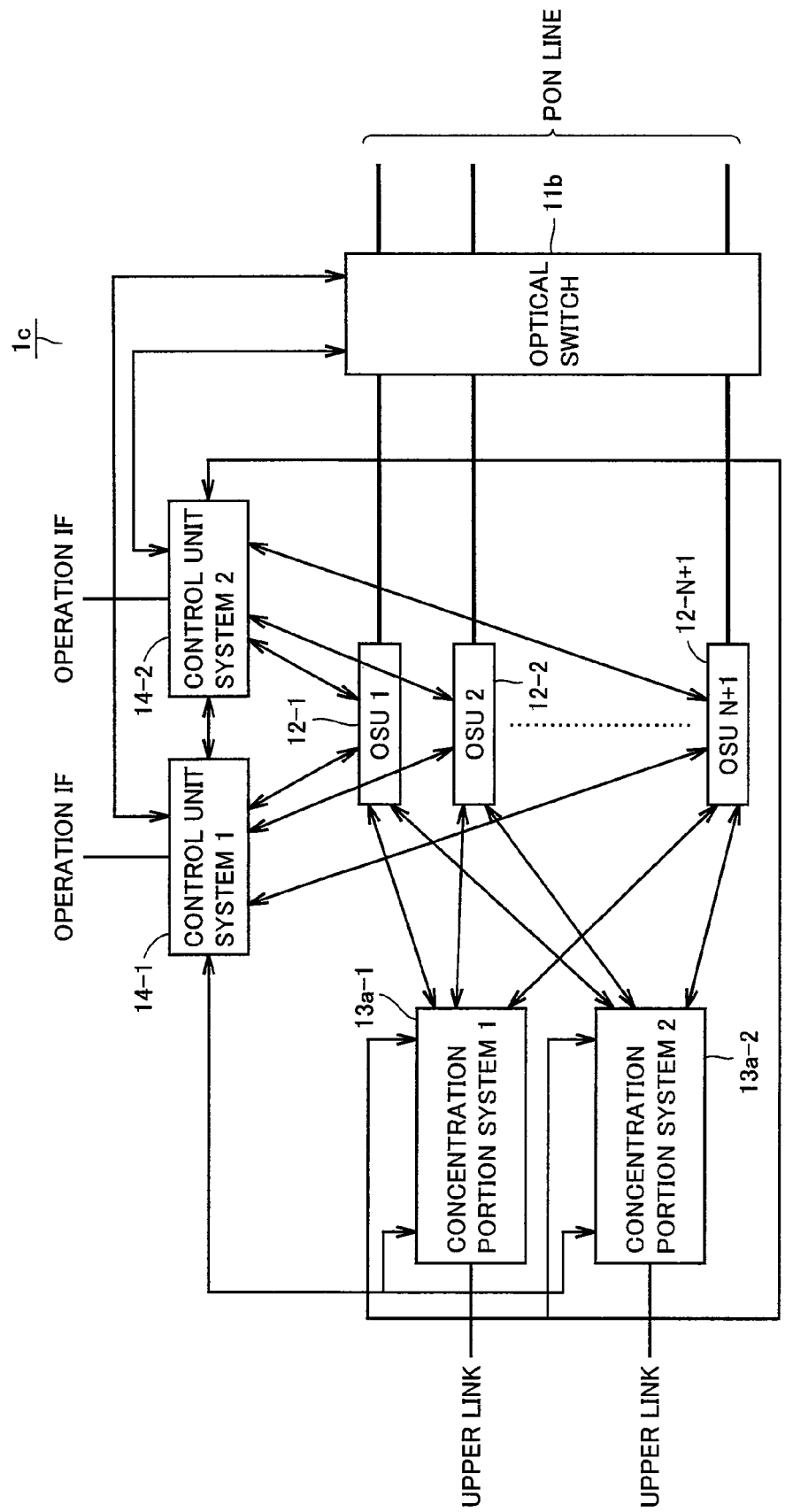
FIG. 31 is a block diagram showing a schematic configuration of a terminal device in a third embodiment of the present invention.

FIG. 31 is a block diagram showing a schematic configuration of a terminal device in a third embodiment of the present invention. In this terminal device 1c, the concentration portion and the control unit in terminal device 1a described in the first embodiment are duplexed. Namely, a concentration portion 13a-1 in a system 1 and a concentration portion 13a-2 in a system 2 as well as a control unit 14-1 in a system 1 and a control unit 14-2 in a system 2 are included.

Figure 32:
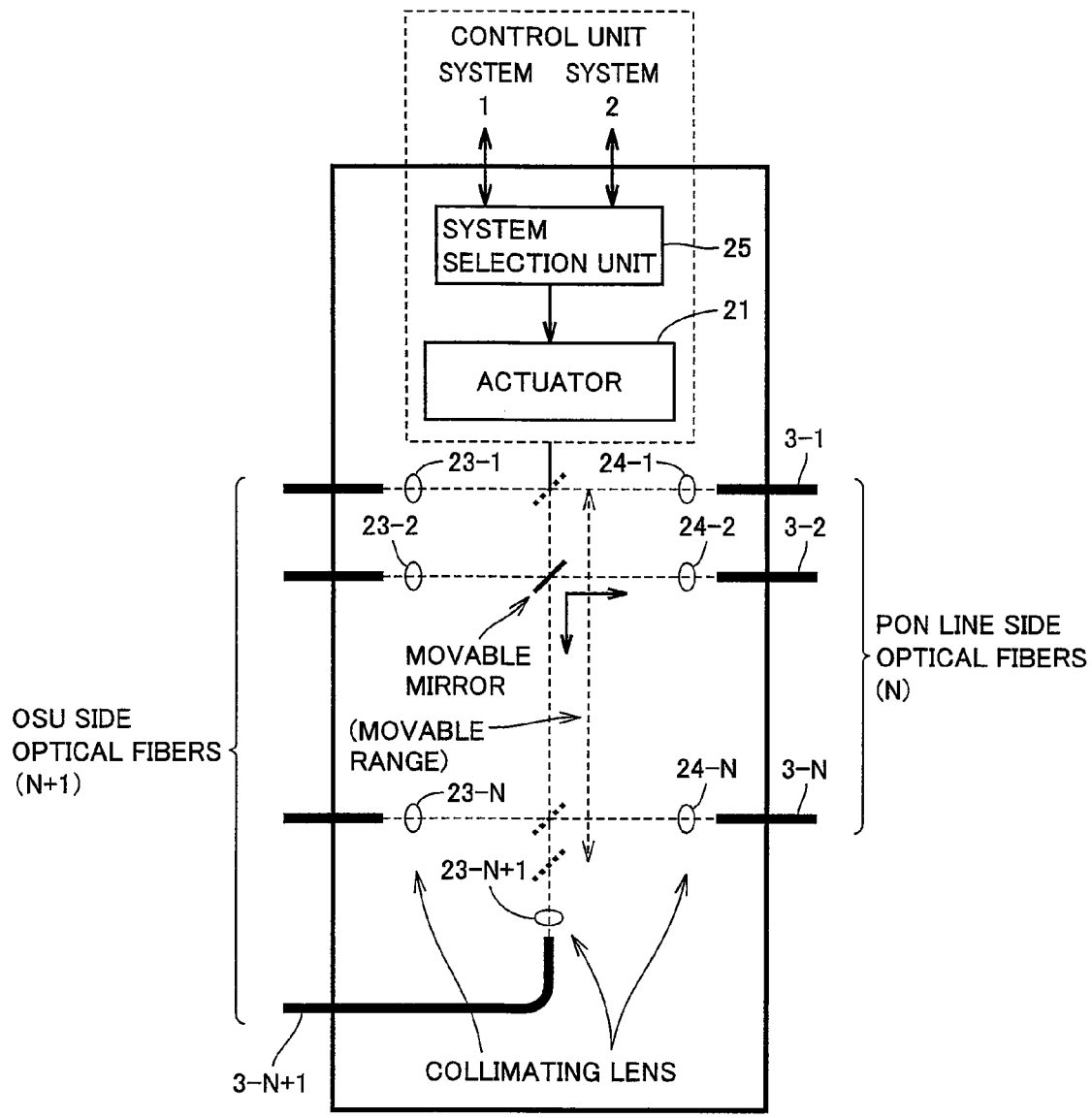
FIG. 32 is a diagram showing an exemplary configuration of an optical switch in the third embodiment of the present invention.

FIG. 32 is a diagram showing an exemplary configuration of an optical switch 11b in the third embodiment of the present invention. This optical switch 11b is different from optical switch 11a in the first embodiment shown in FIG. 2 only in that a system selection unit 25 is added. This system selection unit 25 selects any of a control signal from control unit 14-1 in the system 1 and a control signal from control unit 14-2 in the system 2.

System selection unit 25 continually establishes administrative communication with control unit 14-1 in the system 1 and control unit 14-2 in the system 2, autonomously determines an active control unit, and outputs a control signal from the active control unit to actuator 21.

Control IF portion 32 in OSU 12 shown in FIG. 3 has an interface with control unit 14-1 in the system 1 and control unit 14-2 in the system 2. Control IF portion 32 continually establishes administrative communication with control unit 14-1 in the system 1 and control unit 14-2 in the system 2 through this interface and autonomously determines an active control unit. Then, control IF portion 32 processes only a signal from the active control unit while it outputs the same signal to both control units.

Similarly, concentration IF portion 31 has an interface with control unit 14-1 in the system 1 and control unit 14-2 in the system 2. Concentration IF portion 31 outputs upstream frames to concentration portions 13a-1 and 13a-2 in both systems and outputs downstream frames sent from both systems to FIFO 2 (38). Since downstream frames are never sent from the stand-by concentration portion, there is no collision. In addition, as a precaution for abnormality of a concentration portion, an ingress signal from a stand-by system may be cut off. In this case, a system is selected by control unit 14-1 or 14-2 through control IF portion 32.

Control IF portion 44 in concentration portion 13*a* shown in FIG. 4 has an interface with control unit 14-1 in the system 1 and control unit 14-2 in the system 2. Control IF portion 32 continually establishes administrative communication with control unit 14-1 in the system 1 and control unit 14-2 in the system 2 through this interface and autonomously determines an active control unit. Then, control IF portion 44 processes only a signal from the active control unit while it outputs the same signal to both control units.

When the concentration portion is duplexed, selection of a path is reflected on setting of path connection/path disconnection of filter portion 46*a*. The active control unit issues this instruction through control IF portion 44. For example, when the concentration portion is adapted to 1:1 redundancy, in the stand-by concentration portion, both of upstream paths and downstream paths of all filter portions should only be set to disconnection. Alternatively, in adaptation to 1+1 redundancy, in the stand-by concentration portion, downstream paths of all filter portions should only be set to disconnection.

IO control unit 54 in control unit 14 shown in FIG. 5 can interface with an IO control unit in the other control unit. CPU 51 establishes administrative communication with a CPU in another system through IO control unit 54 and autonomously determines whether to serve as active or stand-by. Alternatively, the operation IF may explicitly indicate active/stand-by. Since signals from each portion/unit in the terminal device are input to both systems, even the stand-by system can trace change in a state within the terminal device or a state of a PON line.

Redundancy of a concentration portion can enable 1:1 redundancy, 1+1 redundancy, and load sharing. Here, for load sharing, OSUs are divided into two groups (A group and B group), and during regular operation, concentration portion 13*a*-1 in the system 1 concentrates lines in group A, while concentration portion 13*a*-2 in the system 2 concentrates lines in group B. Then, for example, if a fault occurs in concentration portion 13*a*-1 in the system 1 or the upper link, switching is made such that concentration portion 13*a*-2 in the system 2 concentrates lines in both groups. In 1:1 redundancy or load sharing, upper link transmission and reception unit 41 in concentration portion 13*a* establishes administrative communication through the upper link, monitors a state of the upper link, receives notification of a fault from the opposing device, and notifies control unit 14 of a corresponding alarm when abnormality occurs.

When control unit 14 recognizes abnormality of the active concentration portion, control unit 14 makes switching to another system if the concentration portion in another system normally operates. This switching is made by changing path setting of filter portion 46*a* in concentration portion 13*a*, in accordance with a redundant configuration (1:1, 1+1, load sharing). In the case of load sharing, control unit 14 receives an external instruction through the operation IF and changes path setting of filter portion 46*a* in concentration portion 13*a*, so as to recover the state of load sharing.

In switching control unit 14, though bandwidth allocation is taken over, an operation to strictly take over bandwidth allocation including past allocation and an operation to newly calculate a bandwidth without taking over past allocation are available. In the former case, the active control unit notifies the stand-by control unit of a control message transmitted to each PON line, including contents indicating to which OSU a message was transmitted.

As described above, according to the terminal device in the present embodiment, redundancy of the control unit and the concentration portion in the terminal device in the first embodiment is achieved. Therefore, in addition to the effects described in the first embodiment, fault-resilient performance could further be improved without significantly lowering cost effectiveness.

Fourth Embodiment

Figure 33:
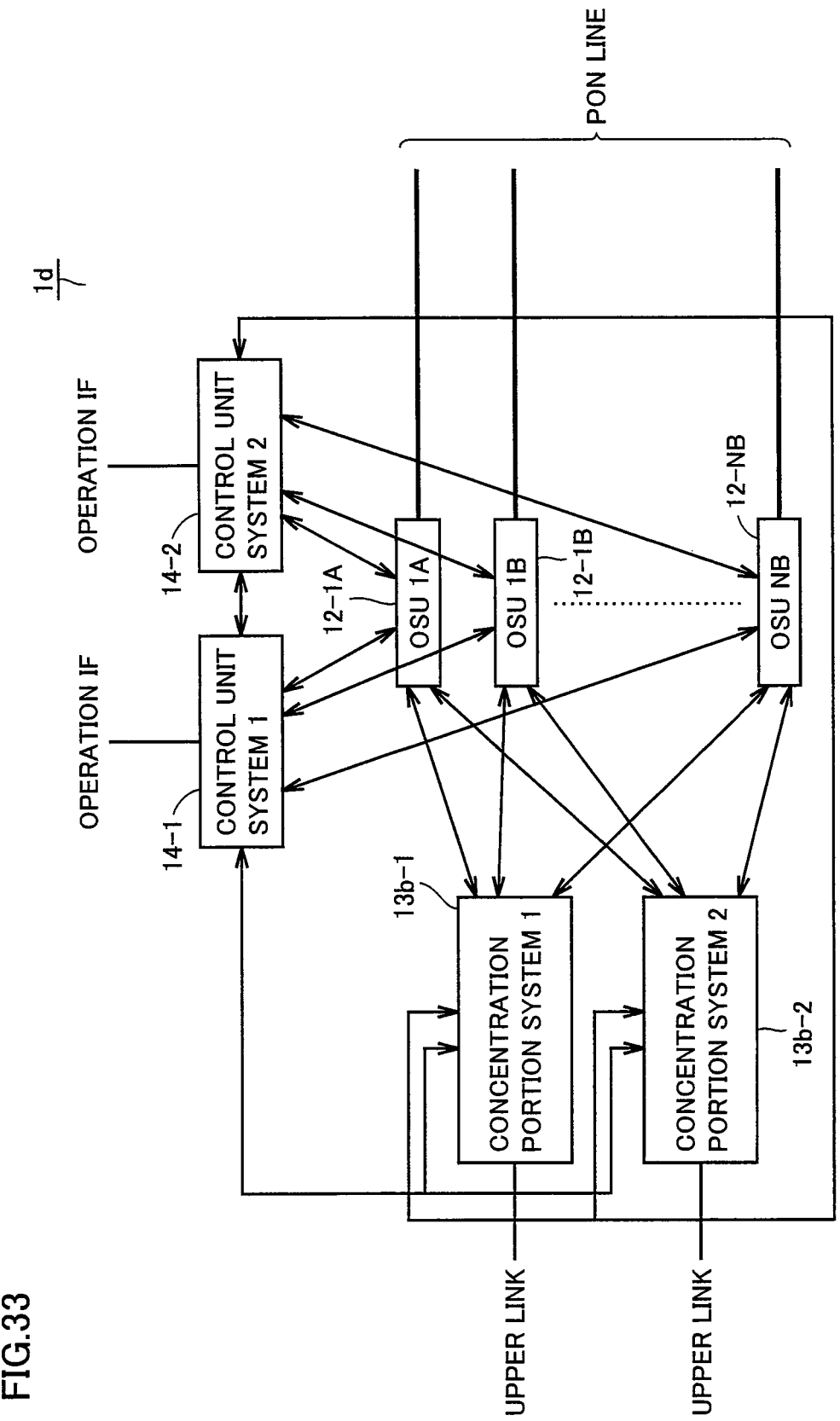
FIG. 33 is a block diagram showing a schematic configuration of a terminal device in a fourth embodiment of the present invention.

FIG. 33 is a block diagram showing a schematic configuration of a terminal device in a fourth embodiment of the present invention. In this terminal device 1*d*, the concentration portion and the control unit in terminal device 1*b* described in the second embodiment are duplexed. Namely, a concentration portion 13*b*-1 in the system 1, a concentration portion 13*b*-2 in the system 2, control unit 14-1 in the system 1, and control unit 14-2 in the system 2 are included. It is noted that system selection control is the same as described in the third embodiment. Therefore, detailed description will not be repeated here.

Regarding setting of a duplex configuration, AND of path connection/path disconnection determined by the duplex configuration of OSUs and PON lines and path connection/path disconnection determined by the duplex configuration of the concentration portion should only be reflected on filter portions 1 to N in concentration portion 13*b*-1 in the system 1 (a path is disconnected except for pass connection in both cases). This is also applicable to concentration portion 13*b*-2 in the system 2.

As described above, according to the terminal device in the present embodiment, redundancy of the control unit and the concentration portion in the terminal device in the second embodiment is achieved. Therefore, in addition to the effects described in the second embodiment, fault-resilient performance could further be improved without significantly lowering cost effectiveness.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A terminal device accommodating a plurality of passive optical networks comprising:
   a plurality of optical subscriber units connected to said plurality of passive optical networks respectively; and
   a control unit for performing registration processing for registering in said terminal device, a plurality of subscriber devices connected to said plurality of passive optical networks and processing for bandwidth allocation for said plurality of subscriber devices,
   said control unit being configured to associate each of said plurality of optical subscriber units with a corresponding one of a plurality of virtual optical subscriber units, to register each of said subscriber devices in a corresponding one of said virtual optical subscriber units in said registration processing, and to generate a control message for performing said registration processing and a control message for performing said processing for bandwidth allocation, and
   when a communication path is changed between one of said plurality of passive optical networks and an associated one of said plurality of optical subscriber units, wherein the communication path is used for the control messages, said control unit to change said virtual optical subscriber unit from being associated with the optical subscriber unit corresponding to the communication path that is changed to a different one of the optical subscriber units corresponding to a different communication path while also maintaining a state of registration in which said plurality of subscriber devices are registered in said virtual optical subscriber unit.

2. The terminal device according to claim 1, further comprising a concentration portion for multiplexing upstream frames from said plurality of optical subscriber units and transmitting the multiplexed upstream frames to an upper link and distributing downstream frames from the upper link to each optical subscriber unit, wherein
said control unit is configured to switch the optical subscriber unit while a state of registration of said plurality of subscriber devices is maintained, by changing a communication path between said plurality of passive optical networks and said plurality of optical subscriber units and by changing setting of said concentration portion.

3. The terminal device according to claim 1, further comprising an optical switch portion for switching connection between said plurality of optical subscriber units and the plurality of passive optical networks, wherein
said plurality of optical subscriber units include a stand-by optical subscriber unit, and
said control unit is configured to control said optical switch portion to make such switching that at least one of said plurality of passive optical networks is connected to said stand-by optical subscriber unit while a state of registration of said plurality of subscriber devices is maintained.

4. The terminal device according to claim 1, wherein
said plurality of optical subscriber units include an active optical subscriber unit and a stand-by optical subscriber unit, and
said control unit is configured to switch a communication path with said plurality of passive optical networks, from a communication path via said active optical subscriber unit to a communication path via said stand-by optical subscriber unit, while a state of registration of said plurality of subscriber devices is maintained.

5. The terminal device according to claim 1, comprising an active control unit and a stand-by control unit, wherein
the active control unit is configured to switch from said active control unit to said stand-by control unit while a state of registration of said plurality of subscriber devices is maintained.

6. The terminal device according to claim 1, comprising an active control unit and a stand-by control unit and an active concentration portion and a stand-by concentration portion, wherein
the active control unit is configured to switch from said active control unit o said stand-by control unit or to switch from said active concentration portion to said stand-by concentration portion while a state of registration of said plurality of subscriber devices is maintained.

7. A method of controlling a terminal device accommodating a plurality of passive optical networks, comprising the steps of:
successively performing registration processing for registering in said terminal device, a plurality of subscriber devices connected to said plurality of passive optical networks and processing for bandwidth allocation for said plurality of subscriber devices by successively generating control messages for performing said registration processing and a control message for performing said processing for bandwidth allocation;
associating each of said plurality of optical subscriber units with a corresponding one of a plurality of virtual optical subscriber units and registering each of said subscriber devices in a corresponding one of said virtual optical subscriber units in said registration processing;
when a communication path is changed between one of said plurality of passive optical networks and an associated one of said plurality of optical subscriber units, wherein the communication path is used for the control messages, changing said virtual optical subscriber unit from being associated with the optical subscriber unit corresponding to the communication path that is changed to a different one of the optical subscriber units corresponding to a different communication path, while also maintaining a state of registration in which that said plurality of subscriber devices are registered in said virtual optical subscriber unit.

8. A computer-readable storage medium storing a non-transitory program for causing a computer to perform a method of controlling a terminal device accommodating a plurality of passive optical networks, said program causing the computer to perform the steps of:
successively performing registration processing for registering in said terminal device, a plurality of subscriber devices connected to said plurality of passive optical networks and processing for bandwidth allocation for said plurality of subscriber devices by successively generating control messages for performing said registration processing and a control message for performing said processing for bandwidth allocation;
associating each of said plurality of optical subscriber units with a corresponding one of a plurality of virtual optical subscriber units and registering each of said subscriber devices in a corresponding one of said virtual optical subscriber units in said registration processing;
determining a communication path for control messages for performing said processing for registration and a control message for performing said processing for bandwidth allocation by optical subscriber units (OSU) mapping; and
when a communication path by OSU mapping is changed between one of said plurality of passive optical networks and an associated one of said plurality of optical subscriber units, wherein the communication path is used for the control messages, changing said virtual optical subscriber unit from being associated with the optical subscriber unit corresponding to the communication path that is changed to a different one of the optical subscriber units corresponding to a different communication path, while also maintaining a state of registration of said plurality of subscriber devices.

9. A terminal device accommodating a plurality of passive optical networks, comprising:
a plurality of optical subscriber units;
an optical switch for connecting each of the passive optical networks to corresponding one of a plurality of optical subscriber units; and
a control unit for performing registration processing for registering in said terminal device, a plurality of subscriber devices connected to said plurality of passive optical networks and processing for bandwidth allocation for said plurality of subscriber devices,
said control unit being configured to associate each of said plurality of optical subscriber units with a corresponding one of a plurality of virtual optical subscriber units, to register each of said subscriber devices in a corresponding one of said virtual optical subscriber units in said registration processing, and to generate a control message for performing said registration processing and a control message for performing said processing for bandwidth allocation, and when a communication path is changed between one of said plurality of passive optical networks and an associated one of said plurality of optical subscriber units, wherein the communication path is used for the control messages, said control unit to change said virtual optical subscriber unit from being associated with the optical subscriber unit corresponding to the communication path that is changed to a different one of the optical subscriber units corresponding to a different communication path while also maintaining a state of registration in which said plurality of subscriber devices are registered in said virtual optical subscriber unit.

* * * * *